United States Patent
Wisler et al.

(10) Patent No.: US 10,086,291 B1
(45) Date of Patent: Oct. 2, 2018

(54) COMMUNICATIONS BETWEEN AN A/V COMMUNICATIONS NETWORK AND A SYSTEM

(71) Applicant: Masque Publishing, Inc., Lone Tree, CO (US)

(72) Inventors: James M. Wisler, Lone Tree, CO (US); Anthony G. Andersen, Aurora, CO (US); John C. Ridges, Highlands Ranch, CO (US)

(73) Assignee: MASQUE PUBLISHING, INC., Lone Tree, CO (US)

( * ) Notice: Subject to any disclaimer, the term of this patent is extended or adjusted under 35 U.S.C. 154(b) by 418 days.

(21) Appl. No.: 14/944,596

(22) Filed: Nov. 18, 2015

Related U.S. Application Data

(63) Continuation of application No. 13/920,594, filed on Jun. 18, 2013.

(60) Provisional application No. 61/708,889, filed on Oct. 2, 2012.

(51) Int. Cl.
| | |
|---|---|
| *A63F 13/75* | (2014.01) |
| *G06F 17/30* | (2006.01) |
| *H04N 21/43* | (2011.01) |
| *G06F 3/16* | (2006.01) |

(52) U.S. Cl.
CPC .............. *A63F 13/75* (2014.09); *G06F 3/165* (2013.01); *G06F 17/30017* (2013.01); *G06F 17/3074* (2013.01); *H04N 21/4307* (2013.01)

(58) Field of Classification Search
None
See application file for complete search history.

(56) References Cited

U.S. PATENT DOCUMENTS

| | | |
|---|---|---|
| 6,979,264 B2 | 12/2005 | Chatigny et al. |
| 7,653,250 B2 | 1/2010 | Jeong et al. |
| 7,692,682 B2 | 4/2010 | Pun et al. |
| 7,817,180 B2 | 10/2010 | Jeong et al. |
| 7,864,209 B2 | 1/2011 | Jeong et al. |
| 7,949,117 B2 | 5/2011 | Jeong et al. |
| 8,057,298 B2 | 11/2011 | Nguyen et al. |
| 8,092,309 B2 | 1/2012 | Bickley |
| 8,152,645 B2 | 4/2012 | Walker |
| 2003/0176218 A1 | 9/2003 | LeMay et al. |
| 2005/0009605 A1 | 1/2005 | Rosenberg et al. |

(Continued)

OTHER PUBLICATIONS

U.S. Appl. No. 13/920,594, filed Jun. 13, 2013, Wisler et al.

(Continued)

*Primary Examiner* — Robert T Clarke, Jr.
(74) *Attorney, Agent, or Firm* — Sheridan Ross P.C.

(57) ABSTRACT

Video of players is used to monitor them while they are playing online games. Each player utilizes a user terminal that includes a camera. Video, such as a player's face, from each camera is sent during game play to an observer system that includes a monitor. An observer can view players' faces using the monitor in connection with the observer making decisions related to players' behaviors and ages in order to regulate player online game play. Players are able to generate reports regarding other players' behaviors and appearances, which are sent to the controller, for review by the observer. Information related to a player's behavior and/or appearance could also be automatically generated using a player's video.

22 Claims, 16 Drawing Sheets

(56) References Cited

U.S. PATENT DOCUMENTS

| | | |
|---|---|---|
| 2005/0075153 A1* | 4/2005 | Valero Moreno ....... G07F 17/32 463/1 |
| 2006/0245379 A1 | 11/2006 | Abuan et al. |
| 2006/0258427 A1* | 11/2006 | Rowe .................. G07F 17/3237 463/16 |
| 2007/0149278 A1 | 6/2007 | Walker et al. |
| 2007/0270213 A1 | 11/2007 | Nguyen et al. |
| 2008/0113783 A1 | 5/2008 | Czyzewski et al. |
| 2008/0172463 A1 | 7/2008 | Qin et al. |
| 2011/0107220 A1 | 5/2011 | Perlman |
| 2011/0116409 A1 | 5/2011 | Jeong et al. |
| 2012/0206557 A1 | 8/2012 | Ridges et al. |
| 2012/0209933 A1 | 8/2012 | Ridges et al. |
| 2013/0005443 A1 | 1/2013 | Kosta et al. |
| 2013/0252737 A1 | 9/2013 | Mescon et al. |
| 2014/0228098 A1 | 8/2014 | Englman et al. |
| 2014/0370959 A1 | 12/2014 | Yacenda |

OTHER PUBLICATIONS

Hamilton et al., "Synchronized Communication and Coordinated Views: Qualitative Data Discovery for Team Game User Studies," CHI 2009, Spotlight on Works in Progress, Session 2, Apr. 4-9, 2009, Boston, MA, USA, pp. 4573-4578.

Official Action for U.S. Appl. No. 13/920,594, dated Feb. 11, 2015, 24 pages.

Final Action for U.S. Appl. No. 13/920,594, dated Jul. 22, 2015, 37 pages.

* cited by examiner

COMMUNICATIONS BETWEEN AN A/V COMMUNICATIONS NETWORK AND A SYSTEM

CROSS REFERENCE TO RELATED APPLICATION

This application claims the benefits of, including priority to, U.S. patent application Ser. No. 13/920,594 filed Jun. 18, 2013 and entitled "Monitoring Online Game Play", which claims the benefits of, including priority to, U.S. Provisional Application Ser. No. 61/708,889, filed Oct. 2, 2012 entitled "Monitoring Online Game Play", the entire contents of which is incorporated herein by this reference.

FIELD OF THE INVENTION

The present invention relates to video, voice and information communications from a plurality of user terminals to a system, including synchronization by the system of voice data stored by it, with such voice data having been communicated by at least two of the user terminals.

BACKGROUND OF THE INVENTION

The popularity of games available for play in casinos has resulted in substantial numbers of avid and recreational casino game players. Generally, the gaming industry wants to provide these players, as well as potential new players, with more opportunities to play casino games. A significant growth opportunity for casino game playing involves online play, which play requires government approvals and regulations. Recent favorable actions by some state governments indicate that online casino gaming is becoming available in the United States. Because of the unique nature of online play as compared to onsite casino game play, a number of factors or issues must be addressed and resolved by the regulatory agencies, casino owners and/or others involved with online casino games in which real money is transacted. Chief among such challenges include ensuring that all players meet any legal age requirement and that all players play fairly, including having protective measures that prevent, or substantially prevent, player cheating. Offensive, annoying or other unacceptable player behaviors should also be policed. During play of online games in which a number of players are playing with each other and online chat is available, it is not uncommon to utilize individual supervisors who monitor the texted and/or audio chat. Such supervisors can typically regulate participation of players in such games when such chat is deemed to be improper or unacceptable by them. Supervisors can be apprised of player chat behaviors by players sending possibly offending chat to the supervisors for their review.

Gaming industry entities have advanced and/or devised systems that provide or offer solutions to certain challenges associated with online casino gaming where money is transacted, including use of cameras and face recognition software, but these do not involve the continuous monitoring of players using player images. Therefore, in order to fully handle possible underage players, together with player cheating, nudity, vulgar language and other undesirable forms of behavior, it would be advantageous to provide methods of operation, and a system which incorporates such methods, that monitor online players using video data associated with each player. The video data can be used by authorized systems personnel in connection with making determinations related to players, including their ages, their conduct and their behaviors, which can be utilized in regulating game play. With regard to obtaining the video data, certain communications-related technology or products (identified using the trademark "AirJoin") could be employed, as described in the following: U.S. patent application Ser. No. 13/028,698 filed Feb. 16, 2011 entitled "Peer-To-Peer Communications" and its CIP identified by U.S. patent application Ser. No. 13/372,645 filed Feb. 14, 2012 entitled "Communications Adaptable to Mobile Devices." The contents of each of these two patent applications are hereby incorporated by reference in their entireties into this application.

SUMMARY OF THE INVENTION

In accordance with the present invention, a system is provided for use in monitoring players, who are playing online games, such as games in which actual money is transacted. Decisions can be made by authorized observers related to the propriety of play, as well as the propriety of the players themselves. An authorized observer can be someone who is part of the system operations personnel (sysop), such as a person of authority, who is responsible for monitoring player' behaviors, as well as for checking to ensure that player age requirements are met. The system includes at least a first network comprising a number of user or player terminals. The user terminals of the first network can be utilized by the players, who together are playing an online game. In one embodiment for use in establishing communications among them, the user terminals are connectable to a peer-to-peer (p2p) server. Each user terminal can have a digital camera, a video screen or display, a microphone and one or more speakers. Each user terminal can also have a computer or control for executing appropriate software, such as game-related software. The software can further include communications enabling software. In that regard, each user terminal preferably includes client software in the form of the previously identified communications technology/product identifiable using the trademark "AirJoin". Such communications software enables video data and audio data to be transferred relative to each client or user terminal. Basically, video data associated with a player utilizing a particular user terminal can be obtained using the camera and the communications enabling software or module. Audio data associated with a player utilizing a particular user terminal can be obtained using the microphone and the communications enabling software. Numerous video data associated with other players playing the particular online game can be managed or controlled by a particular user terminal using the communications enabling software and video can be displayed utilizing that user terminal's video screen or display. Similarly, numerous audio data associated with other players can be managed using the communications enabling software and can be output utilizing that user terminal's one or more audio speakers. Typically, each user terminal's video data can correspond to, or be associated with, an image (e.g. face or head portions) of a player or some other video identifying or representing a player in essentially real time. Each user terminal's audio data can reflect or constitute words or other sounds associated with a particular player and/or the environment of the particular user terminal being used by that player.

The system can also include an observer system that communicates with at least the first network. The observer system is involved with controlling use of the video data and audio data that is obtainable from the user terminals of the first network, which data includes player data and game data. Player data refers to video and/or audio data generated or provided by each player on his or her own using communication devices that are part of the player's user terminal. Game data refers to video data obtained by a game server using the game client operating on the player's user terminal at least while the player is playing an online game. Use of obtainable data includes recording or otherwise storing the data and later reading or playing back preselected portions of such data, usually in connection with monitoring one or more players during play of one or more online games.

With regard to controlling such usage, the observer system can include one or more of: an observer recorder, a playback, an observer storage device, an observer station, a report aggregator and a reservation database. The observer recorder can include software or a software module in communication with each user terminal of the first network. This recorder can also communicate with the game server. The observer recorder can receive and process the player data sent by each user terminal. It can additionally receive and process game data sent by the game server. Such data can be written to the observer storage device which stores it, usually for a predetermined or limited time and after which time the data can be removed or deleted. That is, the most recent data for the predetermined period of time is kept while data not within that recent time period is deleted from the storage device, such as being overwritten with more recent data. The time period can be adjusted and could be, for example, ten minutes so that stored data for each player is continuously updated to result in the most recent ten minutes of data obtained for each player being currently stored using the storage device, while data existing or obtained prior to such ten minutes is no longer available. Controls can be provided to avoid deletion of certain data, such as when data should be maintained for a player monitoring reason. The playback can also include software and it communicates with the observer storage device. The playback can be used in obtaining or reading data from the storage device and processing it for use by the observer station, particularly involving player monitoring functions. In one embodiment, the observer recorder and the playback, together with the storage device are part of a single unit, such as a server.

The reservation database of the observer system can also be software based and can execute one or more processes for use in keeping track of players' locations in the system, such as virtual table locations of players who are currently playing online games or otherwise connected by reservation to the system. In an embodiment in which more than one observer recorder is utilized, such as when the system has a number of networks with a large number of online games simultaneously being played by a substantial number of players, the reservation database can keep track of which one of the multiple observer recorders is associated with a particular player reservation. In connection with obtaining player reservation information in order to perform the necessary processing, the reservation database can communicate with both the system's p2p server and its game server.

The report aggregator of the observer system also communicates with the game server and it can also include software, such as a software module. The primary functions or responsibilities of the report aggregator relate to player monitoring. These functions can include: managing reports generated by reporting players about reported players regarding their alleged behaviors and/or appearances, which appearances are related to the reported players being ineligible to play the online game because they might be underage; keeping track of "monitor points" assigned to reported players, which points are pre-designated by the system based on the types of player behaviors or players allegedly being underage; and determining which observer station each player should be assigned, when more than one station is being utilized, such as when there are a relatively large number of players and usually when more than one authorized observer is required to properly monitor the players currently using the system. With respect to these reports, in addition to an authorized observer being able to continuously monitor players, the system is configured so that the observer can consider information provided by online game players regarding other players. Such information can be provided in such reports using a form available to each player playing an online game, or could be prepared by a game observer to a particular online game. The contents of each report prepared by a reporting player concerning a reported player can be about player behavior, and/or player appearance or image, which can be useful in making judgments about the age of the reported player. After being completed or filled out, the player or a game play observer can cause the report to be sent for processing to the report aggregator. Typically, the report is prepared while the reporting player and the reported player are playing the same online game together. More descriptions regarding the reports and monitor points are provided below. Usually, only one report aggregator is used in the system and is in operable connection with each game server and each observer station.

Generally, the observer station of the observer system is controllable by an authorized observer for use in obtaining or reading stored data from the playback that it uses, or is associated with, so that such data can be processed for viewing (video data) and/or for being heard (audio data) by the observer, as part of the player monitoring responsibilities handled by the observer. The observer station can have, or be definable by, a number of sub-systems and/or components. Like the user terminals, the observer station includes communication devices usable by the authorized observer. These communication devices can include at least one video screen, which can show or display video based on the players' video data and/or show video based on the game data. Such devices can include a microphone, which is usable by the observer in verbal communications, and which could be used in providing text messages in conjunction with voice recognition software. Text messages could also be provided by the observer, such as by retrieving from memory previously stored commonly usable messages, or by using another communication device (e.g. a keyboard). The communication devices can also include one or more audio speakers, including headsets, which can produce audio, including voice, outputs based on the players' audio data. These devices might also comprise a camera for use by the observer in outputting video associated with the observer, in those instances where such video may be desirable or worthwhile.

In addition to these communication devices, the observer station can include other components, such as software programs or modules for providing a number of functions that facilitate player monitoring processes, and which can include a decoder and a communications module. More specifically, when desired by an authorized observer, the contents of a report can be reviewed in connection with making a decision about a particular player. Such review could also include use of the playback, which can obtain selected data about that player. The selected data can involve the player currently being monitored by the authorized observer. Regarding use of the selected data, the decoder is responsive to the obtained selected data for decoding it, e.g., separately outputting video data and audio data so that such outputs are available for subsequent use by the system. Such outputs can involve the use of the observer station's video screen (video data) and/or audio speakers (audio data). For example, the video data could be a particular player's video, which might provide an image of the player on the observer station's video screen who could appear to be underage. Such information shown by the video related to the particular player might be used in determining whether or not the observer might possibly interact with that player, which might lead to a decision discontinuing or restricting play of that player. Communication interactions with the player by the observer could include use of the observer station's microphone, while also relying on the observer station's video screen and audio speaker(s). The software module associated with the observer station for enabling such communications between the observer and the subject player can include the "AirJoin" technology or products. In conjunction with executing, operating or otherwise using the above-noted software components, the observer station also has a control that has at least one processor and could have suitable internal and/or external memory for use in implementing the player monitoring-related functions.

As one representative example and in the context of further descriptions about reports, a report could be submitted by a first player who found that, while playing an online game with at least a second player, the second player's behavior/conduct and/or age appears to the first player as not being proper or not being acceptable. Such improper or unacceptable behavior might include the following: cheating, nudity, vulgar language, intoxication, yelling and generally offensive behavior (e.g. an annoying player). The first player can cause the form report to be displayed on his video screen or user terminal monitor by activating a report activator or selector that is available during online game play. Such activation of the report selector can be initiated after the first player has decided to submit a report concerning the second player's behavior and/or image. Once the form is displayed the report can be completed by this reporting player and subsequently sent to the game server, which then can control communication of the report to the report aggregator for processing by it.

According to one embodiment, a subsequent review of a submitted report by an authorized observer could be made based on a notification that such a report was generated. By way of example, a header/label or other notation could accompany the continuously available reported player's video (e.g. at least portion of the player's face) against whom a report was filed by a reporting player or game observer. The notation might indicate that the reported player should be checked immediately by the authorized observer, e.g. when the report indicates that the reported player appears to be underage. The notation could alternatively indicate that monitoring of the player for an appropriate time is necessary due to certain prohibited player behavior, e.g. when the report indicates that the reported player is yelling. In such a case, the authorized observer might need to review video and/or audio that was stored associated with the reported player and/or current video and/or audio of the reported player in order to make determinations concerning such alleged conduct.

Since an observer might be responsible for monitoring a large number of online game players and in order to more effectively assist the authorized observer and reduce the number of players that the observer should preferably monitor or check at any one period of time, the system and operational methods can also include use of the previously noted monitor points that can be assigned to reported players. Monitor points refer to values or numbers that a player can receive for certain alleged improper behaviors that occur during online game play, and for being judged as not meeting the minimum age required for playing the online game. Generally, players are more likely to be reviewed or checked by an authorized observer when they have at least a predetermined number of monitor points. Conversely, players are less likely to be monitored when they have less than the predetermined number. The magnitude of the monitor points for each improper behavior and for appearing to be underage can be controlled by the system and therefore can be changed by the entity utilizing the system.

Another aspect that can be provided involving monitor points and which can be beneficial when there are large numbers of players relates to including classifications or categories in the system. Based primarily on monitor points, each online game player could be included in a high interest, a medium interest or a low interest classification. A high interest classification is a category that includes those players who should be closely monitored, typically with an authorized observer intervening with such players, since they usually have the most monitor points. In one embodiment, high interest players have at least a threshold number of monitor points. Other high interest players could be those players who have been judged as failing to meet minimum age requirements. A medium interest classification can include players who do not have the threshold number of monitor points, but typically have more monitor points than players in the low interest category. In one embodiment, medium interest players could include new players who do not have any monitor points and almost any monitor points that any such new player receives could cause that player to have his/her classification changed to high interest. A low interest classification might include players who are not likely to be monitored by an authorized observer and typically have one monitor point or a small number of monitor points. As suggested, a player's category can change from a lower classification to a higher classification after receiving sufficient monitor points. Likewise, when sufficient monitor points of a player are deleted or removed, the player's category can change from a higher classification to a lower one. Such deletion of at least some monitor points can occur as a result of the player, who has monitor points, not being subject to additional monitor points for at least a desired time period, e.g. some number of minutes.

Additional possible features or characteristics involving reports and monitor points assigned to reported players could include: (a) managing one or more underage reports on one or more players so that decisions regarding these reports are correctly and efficiently made. More specifically, once an authorized observer determines that the reported player is age eligible to play the online game, the observer can indicate that on the report. And, this report and the decision noted therewith could be stored until an authorized observer deletes the report. Consequently, if one or more further reports are submitted concerning this same player being underage, the observer could obtain the video associated with the report indicating that the player is age eligible. That video can be used to compare that player's facial image with the current player's facial image to make sure that they are the same, or sufficiently the same. If so, the observer can promptly decide that the reported player is age eligible and these further reports can be dismissed or deleted. Conversely, if the reported player's age cannot be verified, that player could be immediately banned from playing by the authorized observer. Alternatively, if the determination is reached that the current player is not the same player who was determined not to be underage, that current player could be banned from playing. In another alternative, the authorized observer could again verify the current player's age; and (b) avoiding additional or multiple instances of monitor points being attributed to the same reported player for the same behavior and/or appearance due to one or more reporting players submitting reports at substantially the same times or different times. That is, the observer could have the option, in order to prevent the addition or accumulation of monitor points for essentially the same alleged offense, of being able to decide that one or more reports are redundant or the contents thereof were previously addressed in another report.

In a preferred embodiment, monitor points could also be assigned to the reporting player who is responsible for providing a report on the reported player. Depending on the number of monitor points that might be assigned to a reporting player, that player could eventually be included in the high interest category and be subject to intervention by an authorized observer, including a decision made by the observer that affects the reporting player. The primary objective in assigning monitor points to reporting players is to ensure that such players, who may have sufficient monitor points based on a relatively significant number of reports filed by them, are considered to determine whether or not they are properly and credibly submitting such reports. It could be that some reporting players do not judiciously prepare reports; instead their reports might not contain credible information that can be relied on by the authorized observer. Like reported players with monitor points, reporting players can have their monitor points due to reports prepared by them decreased if such a player does not send a report for at least one pre-established time period. With respect to the reporting player's credibility in the context of one or more reports sent by him, the authorized observer can reach a decision involving the reported player using appropriate information including the report contents. In view of that decision, the observer can judge the accuracy of the report and thereby the credibility of the reporting player, which judgment can be used to contribute to the overall credibility of the reporting player. Such credibility can form a basis of whether or not the reporting player is trustworthy, including whether or not any subsequent report from that player has sufficiently accurate information. Such credibility, or the suspect nature thereof, could also be relied on by the observer in decreasing, or alternatively increasing, monitor points associated with the reporting player.

In addition to using reports generated by players reporting on other players for alleged improper behaviors and possible underage issues and using monitor points that are assignable when such behaviors and underage possibilities are judged to exist, the system can also include relatively automatic regulation procedures whereby determinations related to players or game play are made by the system itself. Such determinations can involve use of the video data that is made available for each player. More specifically, video data associated with a particular player can represent that player's image (e.g. player's face or portions thereof). If that image does not essentially stay the same, it could mean that a different and non-authorized person is now playing the game. If the same person is not playing the game, it could be indicative that a substitute player is playing who does not meet the age requirements and should be checked. Similarly, if video data from a particular user's terminal does not represent face portions, and therefore such video data would then indicate that no face portions are currently present, then proper monitoring of that player cannot occur and the system could provide notification to that effect. Video data that represents a lack of some movement associated with a particular player could also be the subject of an automatic determination that such a player should be checked. For each instance related to system or relatively automatic regulation, the system employs appropriate software, such as face recognition and/or face detection software, in connection with making these determinations related to player behaviors (e.g. different face portions, no face portions present, lack of player movement) and/or underage possibilities. Another substantially automatic system regulation, but one which involves player behavior, could involve unwanted audio or noise. The system could detect noise over a certain decibel level and report the player having the user terminal from which such noise originated. For example, a player could activate an air horn. All players with activated speakers would hear this offensive sound but it may be difficult for them to determine which user terminal was involved with the offending sound. However, the system itself could accurately make that determination and generate a report directed to the reported or offensive player.

Besides a first network being established by the system to play a particular online game, additional networks could be established by the system at the same time or close in time, with each network usually involving play of one online game, which can be the same game or a different game, having multiple players or even a single player. For example, each of a plurality of networks can be defined by a number of players playing an online game at one gaming table. Each network is established like the first network, preferably using the procedures and requirements of the "AirJoin" technology. A single authorized observer can usually monitor players who are part of more than one network. Consequently, audio data and video data (e.g. representing faces or other images of at least certain players) from a number of networks (i.e. from a number of online games being played at the same time using the same system) could be shown using one or more observer station video screens.

Numerous methods of operation utilizing the system are also provided and can be a function of one or more of: using authorized observers to monitor play and players; using information from players and/or game observers (individuals viewing game play but not playing the game), such as by means of submitted reports; and using video data from players by the system, whereby the system itself provides determinations about play and/or players (substantially automatic play and/or player regulation).

According to one method of operation, an online game is played by a number of players using a virtual online table. While playing, a second player, based on his opinion or judgment, decides to report a first player for behavior that has been designated by the system as being improper or unacceptable. To prepare the report while playing of the game continues, the second player accesses the report form using the video screen or other inputs available on the second player's user terminal. The second player fills out the report, including an indication of the particular alleged behavior that the second player believes warrants issuing a report, as well as other appropriate information that is requested by the form report. Once satisfied with its contents, the second player can control the sending of the report to the game server. The report aggregator of the observer system then manages the contents of the report upon its receipt from the game server, including keeping track of the number of monitor points associated with that report. In response to the report being sent, the observer system is responsible for keeping (not deleting) a predetermined amount of video and audio data that was obtained before the report was sent. The observer system is further responsible for keeping data associated with the first player for a predetermined period of time that begins before and continues immediately after the report was sent. In one embodiment, the observer system could provide a header or notation associated with the reported behavior, such as indicating that the first player needs observation or indicating that the first player should be checked immediately by an authorized observer.

Continuing with this possible one method of operation, based on the number of monitor points associated with the alleged first player's behavior, together with no previous monitor points previously assigned to the first player, as well as no immediate need to check the first player, the first player is not classified in the high interest category. The first player could be placed in the medium interest category. Because of a large number of players then being involved with the system, the observer may decide not to view medium interest players, including viewing of video data (e.g. face portions) associated with the first player and accompanying information, such as the number of monitor points associated with the first player. If one or more additional reports are sent, which accuse the first player of one or more pre-designated unacceptable behaviors, the assigned monitor points could increase sufficiently to cause the observer system to place the first player in the high interest category. That is, the increase is enough so that the first player's monitor points exceed a threshold required for a placement in the high interest category. These additional reports could be sent by players who are all different than the second player, or could include a report from the second player that alleges a behavior different than the behavior alleged previously by the second player. According to this one possible method, such additional reports are sent relatively close to when the second player sent his initial report so that there has been no decrease in monitor points due to the passing of a predetermined time period.

In the case in which the first player has sufficient monitor points so that the first player is classified as high interest by the observer system, the authorized observer can find this out by checking for players currently in the high interest category. Such checking can be conducted by the observer obtaining a display of all high interest players using, among other components, the observer station, including its video screen, which has a slider-indicator for use in controlling which players are displayed, such as all high interest players or only high interest players who are currently playing. Once obtained, the observer station is able to show all high interest players including the first player. Such a display on the observer station video screen includes a picture or video associated with each player, preferably each player's face. The display can include the number of monitor points associated with each player and/or whether the player should be immediately checked, or requires observation, for certain behavior(s) and/or underage play violations. Contacting or otherwise activating at least portions of the display associated with the first player by the authorized observer can cause information regarding the first player to be shown, such as the reports generated on the first player by the other player(s). Additionally, the observer can access, using the observer station, playback and decoder, the videos (represented by stored video data) associated with the first player and view the same. Such videos can include the video data obtained for the first player for the predetermined amount of time before each report was sent and for the predetermined time after each report was sent, which time periods can be different or the same. After any reviewing of such videos and the contents of the reports, the observer can use that information related to making a decision about the first player. The observer could also view the first player in real time (or substantially real time), assuming the first player is still playing, by viewing the first player's image on the observer station video screen. If the observer's decision is to take action with the first player, the observer could have a discussion with the first player related to that decision. The communications module associated with the particular observer station, such as the "AirJoin" communications technology, includes the feature of allowing the observer to verbally communicate with the first player, while not allowing such verbal communications to be available to any other player. If thought desirable, an image associated with the authorized observer could be sent to the first player as well so that the observer and the first player can view each other's images while they are communicating. The judgment made by the observer could include any one or more requirements, restrictions, penalties, or prohibitions involving the first player.

Once the observer has conveyed his decision or terminated his communication with the first player, any appropriate or associated step or procedure concerning the decision could be implemented or prepared for subsequent implementation. For example, if the first player is suspended from game play for a number of hours, a check could be periodically made to ascertain whether the first player is still playing, which check could be a check involving the first player's identity and/or use of face recognition software. The observer could also make determinations regarding the credibility of the reporting players who sent reports that resulted in the judgment made against the first player. Such determinations might include finding that one reporting player's information was substantially supported or accurate or that another reporting player's information was not supported by observations and reviews made by the observer, as well as being at odds with reports issued by others about the first player as concerning the behavior in question. A reporting player who was found by the observer to be essentially accurate in his report would not be subject to any monitor points related to reporting, while a reporting player who is deemed to be sufficiently inaccurate about the first player could be subject to either predetermined monitor points related to credibility or a variable number of monitor points to be determined by the observer.

Based on the foregoing, the present invention enables monitoring of online game players by authorized observers using continuously available player video data to effectively regulate game play and game players. These observers can be assisted in their monitoring responsibilities by players or others who generate reports on other players, which reports concern player behaviors or appearances, thereby affording players an opportunity to provide beneficial observations concerning potential offending players. The observer can also be assisted in regulating players by automatic player-related determinations made by the system itself. The system can include player classifications and monitor points related to a degree or level of interest observers might take in the players, including high, medium and low interest categories, to prioritize those players to be observed resulting in more closely monitoring players of greater interest. The system is highly dynamic and flexible since the owner or controlling entity can regulate or control a number of factors or events regarding allegedly unacceptable player behaviors including: (a) the amount of time that passes before monitor points start to decrease for a particular reported player when there are no other reports submitted concerning that reported player; (b) the time period for which data is kept by the system when there are no reports submitted associated with that data and, related to that, the time period for which data is kept by the system when there are one or more reports submitted associated with that data; (c) the amount of time data is maintained on a reported player before that report, which is related to that data, is received for that reported player, i.e., keeping reported player data before the relevant report is received for the reported player; (d) the number of monitor points assignable for pre-designated behaviors; and (e) increasing (or decreasing) the types of behaviors for which monitor points are assignable. Video data associated with each player can be stored for possible use later by an observer in connection with making any decision related to a particular player's behavior(s) and/or appearance. Previous reports on a player can be archived for possible access of the report's information if the observer thinks that such information would be beneficial to his decision(s) regarding that player. Observers can also have private discussions with players, especially a player to whom an observer is conveying his judgment about the player's behavior and/or possible underage violation. Any such discussion or other intervention with a player can occur at a proper or sensible time, which does not interfere with game play.

Additional advantages of the present invention are readily apparent, particularly when taken together with the following descriptions including the accompanying drawings.

BRIEF DESCRIPTION OF THE DRAWINGS

FIGS. 3A-3J are computer monitor screen shots that illustrate certain aspects related to monitoring players including use of reports and involvement of an authorized observer;

DETAILED DESCRIPTION

Figure 1:
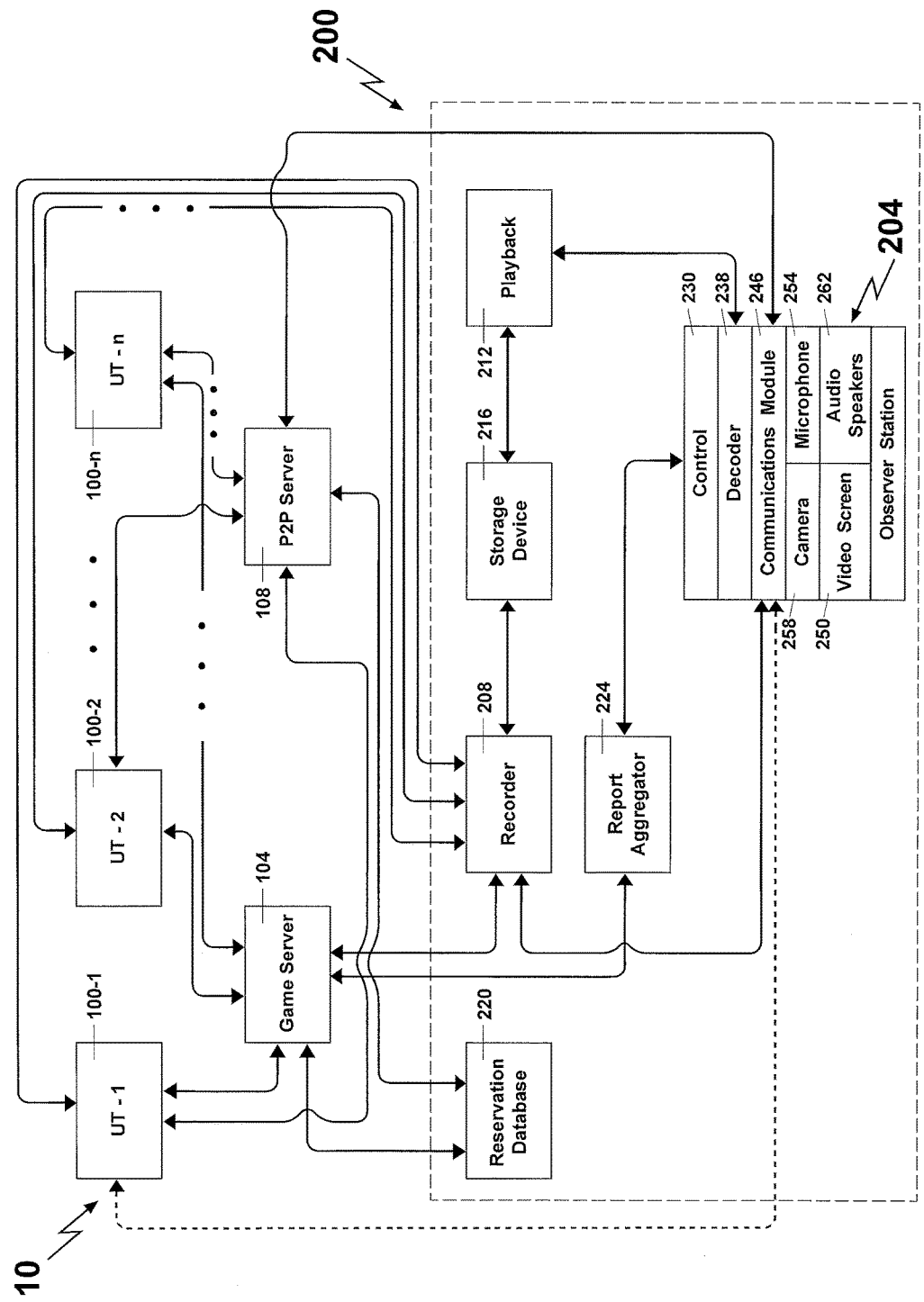
FIG. 1 is a block diagram of a system that illustrates one network comprising user terminals that is established by a number of players to play an online game, with the network in communication with an observer system operated by an authorized observer who is able to monitor players.

With reference to FIG. 1, a system 10 for monitoring online game players using a network is illustrated. The system 10 enables the players to communicate visually and/or verbally with each other. It also enables one or more authorized observers or monitors to controllably interact with one or more of the players, when appropriate or desired.

With respect to communications among players, while playing an online game, the system has a plurality of user or client terminals (UTs) 100 including UTs 100-1, 100-2 . . . 100-*n*. The user terminals 100 can be comprised of different communication apparatuses, such as desktop computers, laptops, tablets, smart devices, portable/mobile phones etc. The particular UTs 100-1 . . . 100-*n* can be determined or established as part of a peer-to-peer (p2p) system, according to one preferred implementation, utilizing a game server 104 and a p2p server 108. The game server 104 and the p2p server 108 are useful in enabling the UTs 100 to exchange video and/or audio communications among themselves. The game server 104 is used in controlling game play among multiple users or players, who use the UTs 100 to communicate with the game server 104, in order to play one or more selected games. Such games can include, by way of example only, card, casino, board and puzzle games. The players, using their UTs 100, access the game server 104 including when they select a particular game they want to play. Such access can be accomplished online using a web browser or a mobile application. Typically, as part of the game playing process, each player is registered with the game server 104 so that the game server 104 recognizes the player as being authorized and authenticated, or otherwise being allowed, to play one or more games controlled by the game server 104. In the context of the present invention, the game server 104 is involved with providing areas, such as virtual tables, whereby multiple players can participate in the same game, as well as rounds of the game, and communicate (verbally and/or visually) with each other while playing the game, e.g. while playing poker at a particular, virtual table. Regarding the establishment of p2p communications among the user terminals 100, the p2p server 108 can use the communication exchanges it has with the UTs 100 of the players to obtain information related to the UTs 100 so that the p2p server 108 can communicate directly with one of more of them. Substantially more descriptions and information about player communications are provided in the afore-incorporated patent applications.

Figure 2:
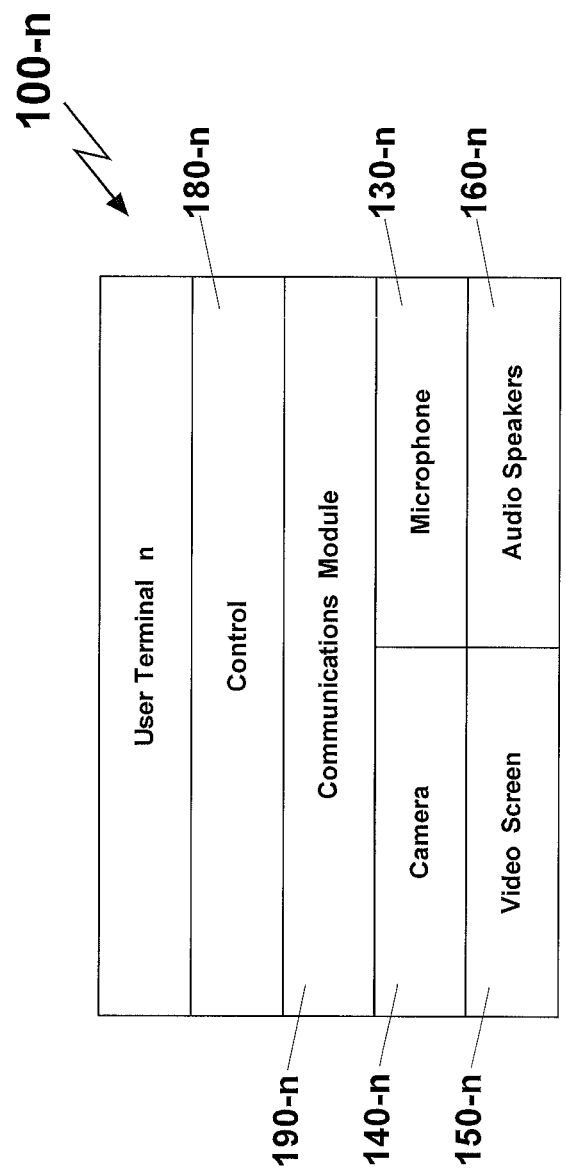
FIG. 2 is a block diagram that illustrates a representative user terminal.

Referring now to FIG. 2, a representative user terminal 100, such as user terminal 100-*n*, is described in the context of certain components that are needed to enable players to communicate with each other, as well as provide video and audio data for use in allowing an authorized observer to monitor game play and the players themselves. More specifically, each user terminal 100, including the user terminal 100-*n*, has a number of communication related devices including: a microphone 130, a digital or web camera 140, a video screen 150, and one or more audio speakers 160. Referring to user terminal 100-*n*, it has a microphone 130-*n* for receiving voice and other sound-related inputs, which inputs are transmittable to other UTs 100 that are involved with the UT 100-*n* in playing a particular online game. The microphone 130-*n* is useful in receiving voice inputs from the player utilizing the user terminal 100-*n* who wants to talk with one or more other players using other UTs 100 involved in playing the same game. For example, the player playing an online card game utilizing the user terminal 100-*n* has the ability to talk with other players playing the same card game using the other UTs 100 during play or during a break in play. Since the other UTs 100 can also have microphones 130, the players using these terminals could also have the ability to use them in connection with talking to other players who are playing with them and are part of the same communications network.

Continuing with the description of the representative user terminal 100-*n*, it has a camera 140-*n* for receiving video inputs, which can be transmitted to the other UTs 100 in the same network. The camera 140-*n* is useful in receiving video information available within the range of the camera 140-*n*, such as the face or image of the player using the UT 100-*n*. Not only can such video data be made available to other UTs 100 in the particular network, it can be made available to an authorized observer for player and game play monitoring purposes. In that regard, for example, online players could be required to reasonably continuously make available at least portions of their faces or risk being penalized or ejected from the game. Like being able to talk to other players using the microphones 130, players using the other UTs 100 can use their UT cameras 140 in order to send their own images or other video information to other players in the network, as well as providing that same information for monitoring purposes.

Another communication related device of the user terminal 100-*n* is the video screen 150-*n*, which is useful in displaying video that can be associated with video data provided by one or more of the UTs 100, including the user terminal 100-*n*. The video data are the product of what is viewed by the cameras 140 of these UTs 100 including player images and other video outputs. Likewise, each of the other video screens 150 is able to output resulting video obtained using the cameras 140 of this network, which is based on a number of players together playing an online game. As provided in more detail in later descriptions, each video screen 150 can be useful and necessary in displaying programmed screens related to a capability of each player providing information involving other players to assist one or more authorized observers in the monitoring process.

The remaining communication output device that is part of the user terminal 100-*n* is one or more audio speakers 160-*n* for outputting audio that results from inputs to the other microphones 130 that are part of UTs 100 that are used in playing an online game, including outputting voice that was provided by one or more other users of the UTs 100. Preferably, audio received by the microphone 130-*n* is not output by the audio speaker(s) 160-*n*.

Each UT 100 additionally has a control 180 including user terminal 100-*n* having a control 180-*n*. As described in significant detail in the afore-incorporated applications, each control 180 has one or more processors for use in, among other things, establishing the communications network that can involve all UTs 100, or at least some of them. In that regard, the control 180-*n*, like other controls 180, can execute software that is used in communicating video and audio data from the UT 180-*n* to one or more of the other UTs 100 that constitute the established communications network. In that regard, each UT 100 has a communications module or software 190, including user terminal 100-*n* having a communications module 190-*n*, that enables or otherwise provides the communications functions or capabilities. A preferred communications module 190-*n* is the subject of extensive descriptions in the afore-incorporated patent applications. Each control 180 can also be used in controlling the transmission of player data for at least temporary storage and possible use, which is described next.

Returning to FIG. 1, with respect to monitoring play and players, the system 10 also includes an observer system 200. The observer system 200 can be used by one or more authorized observers to selectively monitor online game players, make decisions about them, and/or communicate with these players, with such communications usually involving at least one player's behavior(s) and/or appearance. An authorized observer generally refers to an individual who has the responsibility, on behalf of the owner or entity exercising control over the system 10, of regulating or policing players and game play. Such an observer, based on information obtained using the observer system 200, is able to manage his responsibilities in ways highly similar to the ways that casino floor personnel handle players and play in real casinos. In one embodiment, the observer system 200 can be operably connected to each of the UTs 100. Alternatively, the observer system 200 could be in communication with a selected one or more of the UTs 100. Regardless of the operable connection, each of the UTs 100 can have the ability to transfer player and game data, which data can comprise video and/or audio data, either directly or indirectly, to the observer system 200.

The observer system 200 can comprise a number of units or components including: observer station 204; recorder 208, playback 212, storage device 216, reservation database 220, and report aggregator 224. The recorder 208 can be operably connected to the one or more UTs 100. Preferably, the recorder 208 communicates with each individual UT 100. It can also be operably connected to the game server 104. Communications involving each UT 100 and the recorder 208 can include video data and/or audio data from each player who is currently playing an online game using the system 10. Communications between the game server 104 and the recorder 208 can involve online game information or data, including video data representative of game play such as cards dealt and decisions made related to any additional cards received by players during online game play. Player data sent essentially directly from each UT 100, and/or game data sent from each UT 100 using the game server 104, are storable on the storage device 216 using the recorder 208. The playback 212 is also operably involved with the storage device 216. The playback 212 can include software that is executable to read or obtain certain of the data stored with, or written to, the storage device 216 by the recorder 208. For example, the authorized observer may want to review substantially current data providing images and/or audio of players playing an online game at a known and particular virtual table. Under control of the authorized observer using the observer station 204, the playback 212 can obtain the requested data for that table that was previously written to the storage device 216 using the recorder 208. In one embodiment, the recorder 208, the playback 212 and the storage device 216 are part of a single machine, server or computer and in which the recorder 208 and the playback 212 can include software modules that are executable using one or more processors residing with this machine in order to implement the functions or processes associated with such software.

The reservation database 220 of the observer system 200 comprises executable code for implementing one or more processes involved with current online player location in the system, typically based on each player being associated with a reservation. Such a reservation related to player location is created about the time the player logs on to the system 10 in conjunction with wanting to play an online game. In that regard, the reservation database 220 could be responsible for and keep track of: the identities of current players; the identity of the observer recorder(s) 208 for the data associated with each player; and one or more virtual table identifiers, each of which is associated with the players playing at that table.

The report aggregator 224 of the observer system 200 can be considered similar to the recorder 208 in that it also receives data, but not player or game data, rather such data is in the form of information contained in reports. Reports can be prepared and submitted utilizing the UTs 100, or possibly the observer station 204, whereby the contents or information in these reports can be sent to the game server 104 for subsequent transmission to and processing by the report aggregator 224. The report aggregator 224 could also include dedicated memory for storing such pre-processed and/or processed data or information. A report comprises information that is generated by a reporting person about a reported player. The reported player is a player who is alleged or accused by the reporting person of showing or having one or more behaviors that are deemed or defined by the system 10 as being improper or unacceptable for online game play. Additionally and/or alternatively, instead of an unacceptable behavior, the reported player is a player who is alleged by the reporting person to be underage and not legally eligible to play the particular online game. The reporting person can be an online game player playing the same game as the reported player, or the reporting person can be a game observer, or the reporting person could be another individual authorized to submit such reports, such as an authorized observer. More descriptions about the contents and use of reports are provided below.

With regard to functions that can be provided or might be available, the report aggregator 224 could be involved with one or more of the following: keeping a record for each player currently online; for each online game reported player, managing and storing that reported player's active reports, which reports constitute the basis for the number of monitor points (as described below) that are currently assigned to the particular reported player; for each online game reporting person, managing and storing that reporting person's active reports; for each reported player's reports, processing them to determine the total number of monitor points assigned to the reported player; processing monitor points related to decreasing their value over time, as explained below; and managing and storing notations as to whether the reported player should be immediately reviewed by an authorized observer or the observer could observe the reporting player in a reasonable time period (non-immediate).

In connection with retrieving and using player and/or game data, the observer station 204 of the observer system 200 can be controlled by an authorized observer. The observer station 204 can be comprised of sub-systems, modules and/or devices that are collectively employed to manage use of such data, and they can be identified as: a control 230, a decoder 238, and a communications module 246, together with a number of communications-related devices, which are comparable to those that are part of the UTs 100. These communication-related devices that are part of the observer station 204 can include: one or more video or monitoring screens 250 a microphone 254, a camera 258, and one or more audio speakers 262, each of which functions comparably to those that are provided with the UTs 100, particularly in the context of providing communications involving the authorized observer.

The control 230 of the observer station 204 implements the processing functions related to using the data from online game players and the game data from the game server 104. Execution of certain desired functions can be accomplished by the control 230 in conjunction with the decoder 238 of the observer station 204. The decoder 238 can essentially include a de-compressor that receives selected or desired video and/or audio data retrieved by the playback 212. The decoder 238 outputs such data in its decoded state for eventual input to appropriate one or more observer station 204 communication devices, such as the video screen 250. Compressed video data requested from the playback 212 can be received or processed by the decoder 238 and such video data could ultimately be transformed into a video depicting a requested table including the table's players for viewing on the observer station video screen 250.

Figure 3A:

A representative video or monitor screen 250 of the observer station 204 is illustrated in FIG. 3A in the form of a screen shot that shows which players on the screen are currently playing, and/or who have played, online games at a number of different virtual game tables using the system 10. Each player is depicted using at least substantial portions of the player's face. The authorized observer can obtain such player image/face information utilizing the playback 212, the storage device 216, and the decoder 238, as well as the report aggregator 224, while using the processing power of the control 230. According to the embodiment conveyed by FIG. 3A, the players are arranged or ordered using a "High Interest" classification, a "Medium Interest" classification and a "Low Interest" classification. These three classifications are provided to facilitate monitoring of players by the authorized observer. Generally, a player who is in the "High Interest" category is one that is deemed to be a player for whom there is a greater need for monitoring by the observer, particularly in comparison with a player who is not in that category. A player classified as "Medium Interest" is deemed to have a lesser need for monitoring, as compared to a "High Interest" player. A player classified as a "Low Interest" player can be a player for whom there is usually little or no reason for him or her to be monitored by the observer. Classifying players should assist the monitoring responsibility of the observer by essentially prioritizing which players should be observed. Such prioritization may be particularly advantageous for the observer in cases in which the observer has responsibility for monitoring a relatively large number of players and/or has a limited amount of time to be able to monitor all players, while being required sometimes to assess player-related information and make decisions concerning one or more players.

With respect to establishing player classifications, "monitor points", as introduced above, can be utilized. Monitor points can be assigned to one or more players by other players, as well as by non-players (e.g. game observers/game spectators), based on appearances and/or pre-designated unacceptable behaviors of the one or more players. Basically, a greater number of monitor points currently assigned to a player results in a higher likelihood that such a player would be monitored by an authorized observer, in comparison with a player who has no or a lesser number of monitor points. A threshold or predetermined number of monitor points could be defined for use in determining that a player should be classified as a "High Interest" player. For example, if a player has been assigned at least ten monitor points, that player could be deemed to be in the "High Interest" classification. It should be understood that the observer system 200 could have a higher or lower monitor points threshold, which threshold might be a function of the number of current players, the number of observers and/or the degree to which the observer system 200 wants to avoid or control possibly underage players and/or unwanted player behaviors. Monitor points can have a limited existence. Once assigned to a particular player, monitor points can decrease over time. Such a decrease can depend on that player not being assigned more monitor points during the time the monitor points can decrease. Such a decrease could depend on certain reported behavior(s) alleged to occur during the possible decrease time period. For example, if one or more unacceptable behaviors are reported that are the same or similar to the behavior(s) for which the players has monitor points, then any decrease might be terminated or there might be no decrease at all. Alternatively, such a decrease might not occur or could be terminated after some decrease in monitor points, regardless of the kind of recent alleged behavior(s).

Rules related to decreasing monitor points could be configurable or dynamically controlled by the system owner or controlling entity. For example the magnitude of the decrease over predetermined times could be controllably varied, depending on what is satisfactory or successful. One set of possible rules might include: rule 1—decrease monitor points by 0.2 point every hour starting one hour after the last report; and rule 2—decrease monitor points by 1 point every hour starting at four hours after the last report. According to one example for a reported player having 5 monitor points assigned due to a single unacceptable behavior and no further report submitted against that reported player during the period in which the monitor points are decreasing, the decrease in monitor points using these two rules could cause the following results:

at one hour, the monitor points decrease to 4.8 (rule 1)
    at two hours, the monitor points decrease to 4.6 (rule 1)
    at three hours, the monitor points decrease to 4.4 (rule 1)
    at four hours, the monitor points decrease to 4.2 (rule 1)
    at five hours, the monitor points decrease to 3.2 (rule 2)
    at six hours, the monitor points decrease to 2.2 (rule 2)
    at seven hours, the monitor points decrease to 1.2 (rule 2)
    at eight hours, the monitor points decrease to 0.2 (rule 2)
    at nine hours, all monitor points are erased (passed 0 due to rule 2).

The kind of behavior or the player's appearance may also cause a predetermined header or label to be associated with that player related to the timing or priority by which that player should be checked by an authorized observer. For example, a player who is alleged to be too young ("underage") to be playing the particular game could have a header associated with him indicating "immediate check," meaning that the authorized observer should consider that player a priority to be viewed as soon as possible to determine whether the player is underage. In another example, a player who is alleged to be cheating could have a header indicating "needs observation," meaning that an authorized observer is expected to take some time in reviewing a recording that resulted in the cheating allegation and/or view current play of the alleged cheater in order to obtain evidence or other information related to such conduct and make a judgment about that player's alleged cheating.

With respect to identification of player behaviors that could be considered unacceptable and subject to predetermined monitor points, the following player behaviors and player appearance are listed, together with possible monitor points and metrics for reducing and/or removing monitor points that are different than the above-described example which involves two specific rules, as well as a possible "needs observation" or an "immediate" timing or priority designation:

annoying=1, decrement by 1 after 60 minutes of no report of this type ("needs observation")
    cheating=3, decrement by 1 after 120 minutes of no report of this type ("needs observation")
    intoxicated=2, decrement by 1 after 20 minutes of no report of this type ("immediate check"). One possible variant is that all "immediate check" monitor points would not automatically decrement.
    nudity=3, decrement by 1 after 7 minutes of no report of this type ("immediate check")
    other=1, decrement by 1 after 5 minutes of no report of this type
    profanity=1, decrement by 1 after 5 minutes of no report of this type ("needs observation")
    underage=5, no automatic decrement of this type ("immediate")—to avoid young-appearing players being unfairly or improperly reported, a still or video of players that are incorrectly flagged as being underage could be attached to the report. Accordingly, the authorized observer could see the still or the video while observing the live feed and promptly eliminate spurious reports of this type. An "anti-credibility" factor might be included with player records, specifically for underage reports. Another report type identified as "player was replaced by an underage player" might be included to distinguish between spurious underage reports for young-appearing players and other issues.
    yelling=3, decrement by 1 after 7 minutes of no report of this type ("needs observation") (yelling, annoying, profanity, other categories could be combined into an "offensive behaviors" category)
    Possible other "types" might be defined, and there might also be a "cancel" button as part of this dialog Returning to FIG. 3A, additional features associated with this screen shot for monitoring players by an observer are next described. At the top of FIG. 3A are two sliders-indicators 270, 274, which can be used in providing desired player-related information, which information can be readily understood by an observer. Generally, the slider-indicator 270 is used in providing "Online Status" regarding the players depicted in FIG. 3A. More specifically, player Online Status relates to one of two player states, namely: (a) a first status in which all system players are displayed, including those players who are not currently playing (offline players) that have active monitor points; or (b) a second status in which only current system players (online players) are displayed and offline players are not displayed. As shown in FIG. 3A, the slider-indicator 270 can be slid, contacted or otherwise positioned (e.g. by the observer) so that it indicates "All" players are being displayed, whereby FIG. 3A depicts all system players (both online and offline players). FIG. 3B contrasts with FIG. 3A in that the slider-indicator 270 is in its other or second position related to the second status of players so that only online players are shown (indicated by the "online/icon Only"). Accordingly, an observer is able to easily move between displays of "All" system players and only current system players using the slider-indicator 270, depending on which sets of players are to be monitored or considered at any particular time by the observer.

Figure 3C:
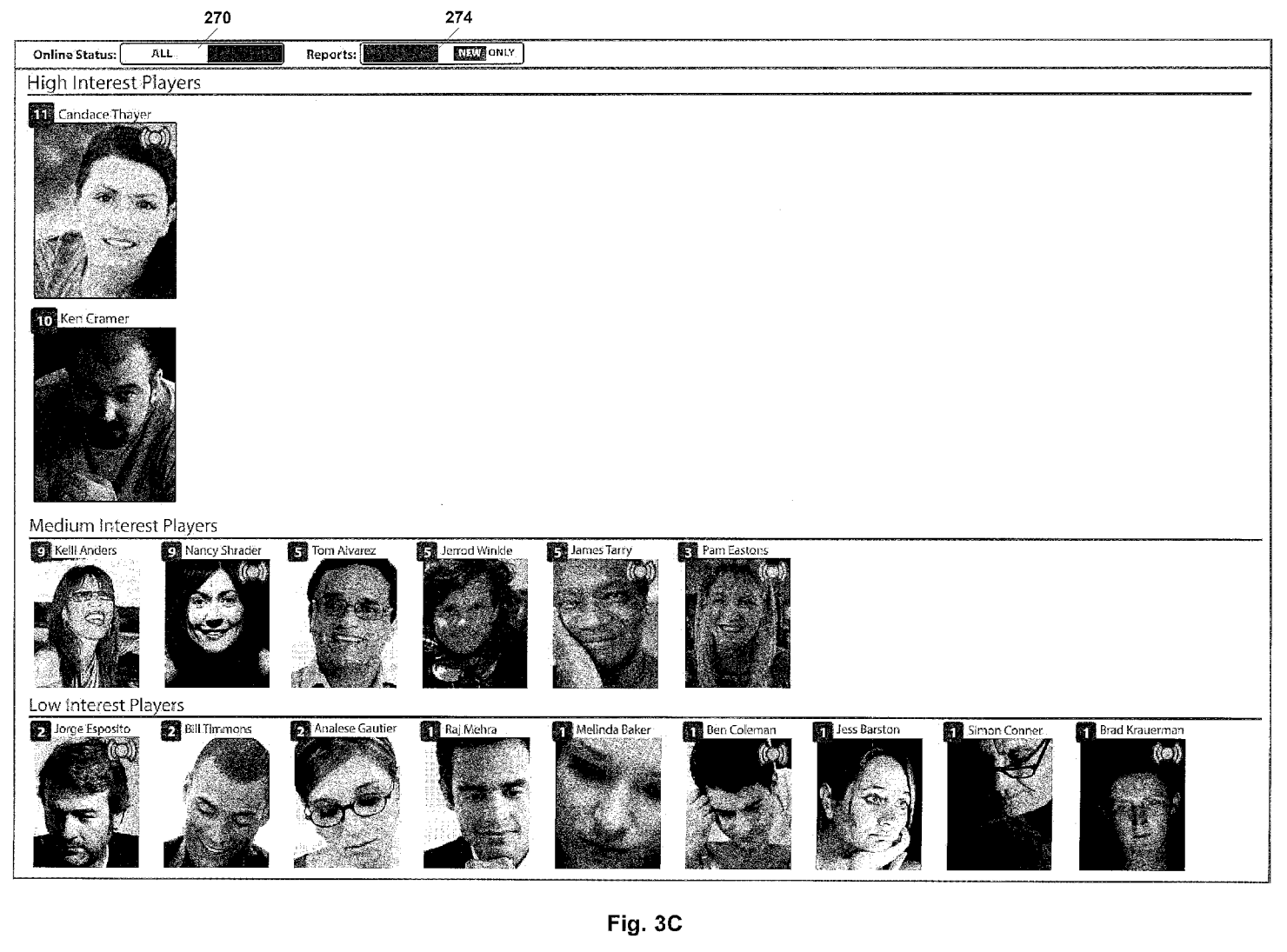

Generally, the slider-indicator 274 is used in providing or identifying players based on "Reports" made against them (or by them). More specifically, player "Reports" relates to either "All" reports submitted for access by the observer or only new (not yet reviewed or handled by an observer) reports. As shown in FIG. 3A, the slider-indicator 274 is positioned so that it indicates that "All" reports associated with the displayed players can be obtained by the observer, including those reports that are not new and were previously reviewed/handled by an observer. FIG. 3C contrasts with FIG. 3A in that the slider-indicator 274 is in its second or other position related to displaying players who have "New Only" reports, so that only those players who have one or more non-reviewed or non-handled reports are shown. For example, using the display of FIG. 3C, an observer is shown all system players for whom there is at least one outstanding ("new") report and for which observer action is typically required.

Figure 3D:
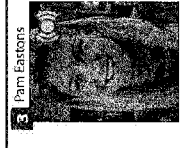

FIG. 3D illustrates another screen shot that is similar to FIG. 3C in that players with "New Only" reports are identified/displayed. However, unlike FIG. 3C, the "Online Status" of players is changed from "All" system players of FIG. 3C to online only players status of FIG. 3D. Thus, FIG. 3D shows only current or online players who are associated with new reports. An observer might consider FIG. 3D useful in identifying online players with new reports who should be more promptly monitored, since they are currently playing and may require more immediate attention, in comparison with offline players.

Additional features illustrated in FIGS. 3A-3D relate to information available to the observer, which information is adjacent to the players' images. With respect to first information, whenever a player is currently a system player ("online") the "online icon" can be positioned within the boundary of that player's image, indicating to the observer that such a player is online. Conversely, for each player not currently playing ("offline"), the "online icon" would not be present, indicating to the observer that each such player is offline. Second information concerns the monitor points associated with the displayed system players. For each player, such monitor points can be displayed in the upper left corner and just above the respective player's face. To assist the observer in readily recognizing such second information, the monitor points are presented in at least two different ways. According to a first presentation or way, to inform the observer that the monitor points are not new, but are the subject of one or more previously handled or reviewed reports, the monitor points are shown using a significantly dark or black color against a relatively light colored, such as white, background. According to the second presentation or way, to inform the observer that one or more of the monitor points are new, and are the subject of one or more reports that have not been previously handled or reviewed, the monitor points are shown using a white or light color against a relatively dark colored, such as red, background. Thus, the observer can easily make determinations about the reports on which the monitor points are based using the way in which such points are displayed.

Figure 3E:
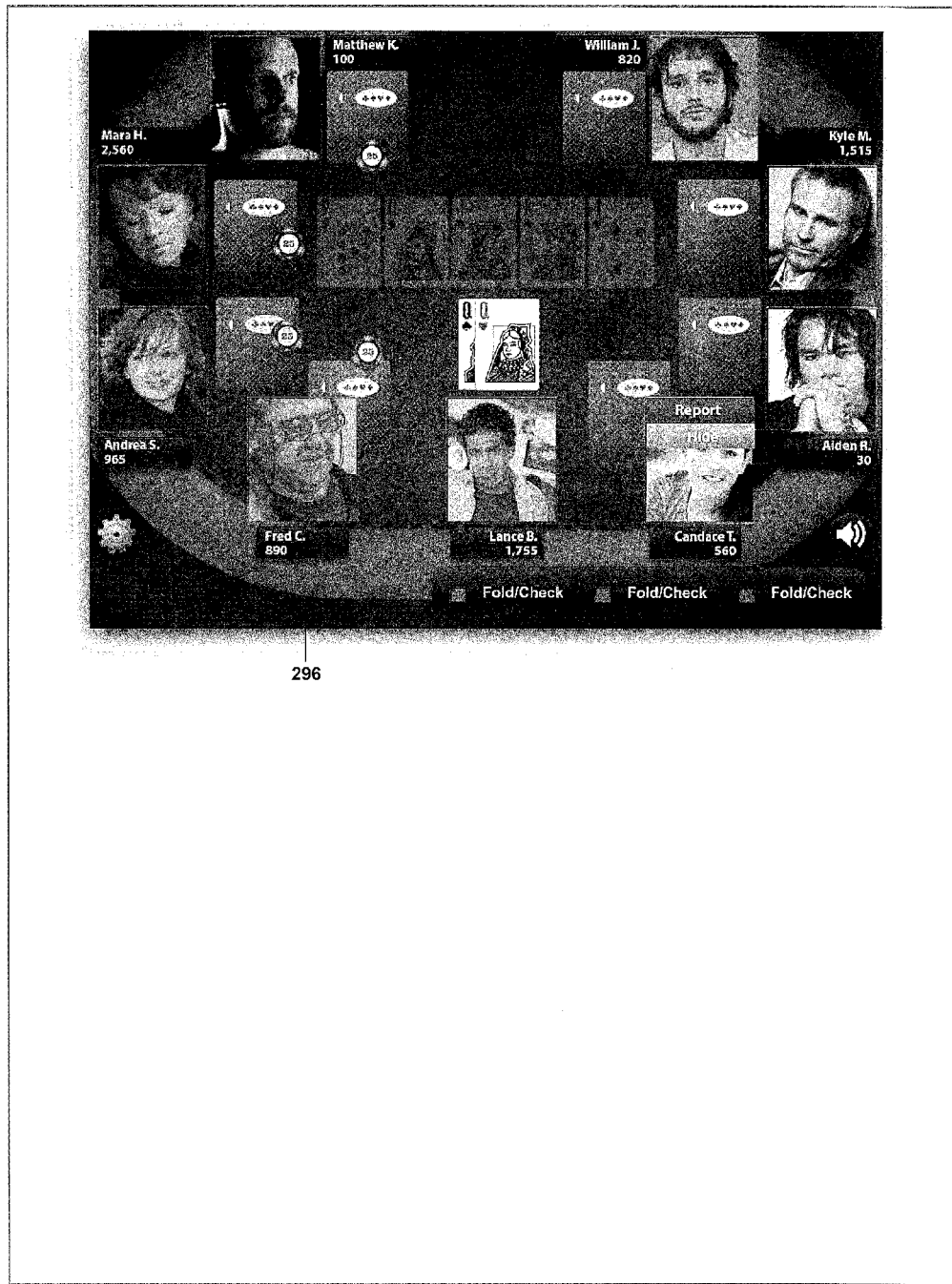

More descriptions regarding the reporting of unacceptable player behaviors by one or more other players and how such reports can be used by an authorized observer are provided with reference to representative screen shots depicted in FIGS. 3E-3J, as well as continuing to refer to one or more of FIGS. 3A-3D. FIG. 3E is a screen shot showing a number of players (in this example, nine players) playing an online poker game in the context of a virtual poker table 296. This screen shot is provided with reference to the machine, device or other apparatus being used by one of the nine players, namely the player (Lance B.—reporting player) shown in the lower center of the virtual table and whose current cards are displayed in face up fashion. FIG. 3E also indicates that one of the players (Candace T.—reported player) has a header or two option control bars (Report and Hide) displayed, which display is controllable, in this example, by Lance B. He can control the display thereof on his video screen 150 and, when wanting to prepare a report concerning Candace T., can cause such a display and then contact or otherwise activate the Report bar. As suggested by the cards being shown, such a report can be done while the players are playing the card game.

Figure 3F:
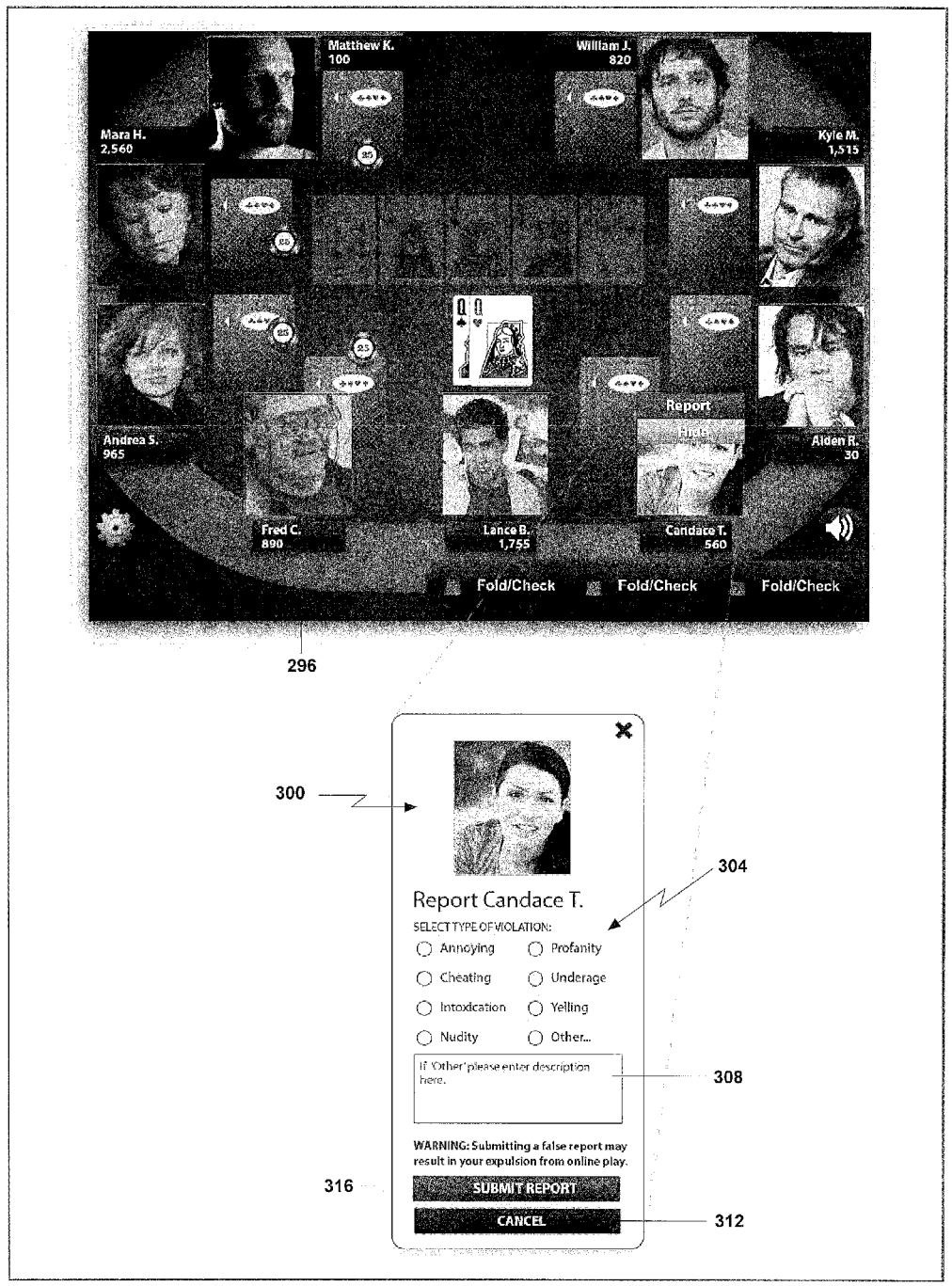

FIG. 3F is a screen shot illustrating a display using the video screen 150 of Lance B.'s user terminal 100 after the Report bar was activated including showing a report form 300 that can be used to prepare a report related to Candace T.'s behavior and/or appearance. The report form includes labels or other indicators 304 associated with behaviors that have been designated as unacceptable or objectionable, together with an indicator associated with the player's appearance (underage), as well as an indicator ("Other") that could be used to report some other aspect involving Candace T. If "Other" were selected or caused to be checked, a message box 308 could be activated for use by Lance B. to type in or otherwise insert descriptive information related to his reason(s) for selecting "Other" in his report. Once the report is prepared including the identification of the unacceptable behavior and/or questioning the age ("underage") involving Candace T., the reporting player has an option to cancel the report using a "Cancel" button 312. In order to send the report, a "Submit Report" bar 316 is touched or activated by the reporting player. Activating the "Submit Report" bar 316 causes the prepared report involving Candace T. to be sent to the game server 104 and then to the report aggregator 224 for processing. Ultimately such information in this report is accessible by authorized individuals, such as one or more authorized observers.

Referring back to FIGS. 3A-3D, descriptions are provided regarding actions that can be taken by an authorized observer using the observer system 200, particularly with reference to the representative example involving the player Candace T (see FIGS. 3A-3D). The players illustrated in FIGS. 3A-3D are classified as being "High Interest", "Medium Interest" or "Low Interest" players based on their number of monitor points, as previously described. In this example, players with ten or more monitor points are deemed to be in the "High Interest" category; players with 3-9 monitor points are in the "Medium Interest" category; and players with 1 or 2 monitor points are in the "Low Interest" category. Other current players presently have no monitor points and could be classified as "No Interest," and, although not shown, such player faces could also be viewed since the observer system 200 is configured to enable an authorized observer to observe all game players associated with the particular observer system 200. Regarding at least FIG. 3A, players in the "High Interest" category are shown such that the players with the greater number of monitor points are positioned to the left and positioned in columns. For example, the two players with the highest number of monitor points (23 and 18) are depicted in the first left side column. Players with relatively less monitor points are shown to the right in columns of two players, and with the players having relatively fewer monitor points being shown in the farthest right column. It should be understood that some players may have the same number of monitor points so that one or more players in adjacent columns may have the same number of monitor points. It can be appreciated that players in the "High Interest" category could be shown in columns having more than two players. Alternatively, in cases in which there are relatively few "High Interest" category players, each such player may be in only one column. The FIG. 3A illustration also has left and right scroll buttons 320, 324, which can be used by the observer to access possible player images in the "High Interest" category that would be different than those shown in FIG. 3A. Controlling the left scroll button 320 could result in different player images, if there are any, together with their corresponding monitor points, being displayed on the left side. Controlling the right scroll button 324 would achieve similar results, except that certain left side images would no longer be displayed (assuming there are more, different images associated with players using the system 10), while different player images would scroll into view on the right side. According to one variant related to scrolling, upon passing of a predetermined time after the completion of the scrolling process, the images could be automatically returned to their original positions in which the player or players having the most monitor points are again displayed in the left most column. In one embodiment, in addition to the number of monitor points, each player's video (e.g. player's face) could also have a time stamp associated therewith to indicate the time that the player's video was received by the observer system 200. In another embodiment, each player's video, at least in the "High Interest" category, could have a notation associated therewith which indicates that the player should either be immediately reviewed or should be observed for some appropriate time period, including the possible option of reviewing one or more stored recordings involving that player. Another possible variant includes providing other or additional means to indicate to the authorized observer which player or players have a relatively greater number of monitor points. For example, besides relying on the position of each player's video or picture using a classification system to convey to the observer which player or players have certain monitor points, other indicia might be relied on such as visual indications including flashing or a colored border adjacent to the video or adjacent to the picture of the player having the relatively greater number of monitor points.

Figure 3G:
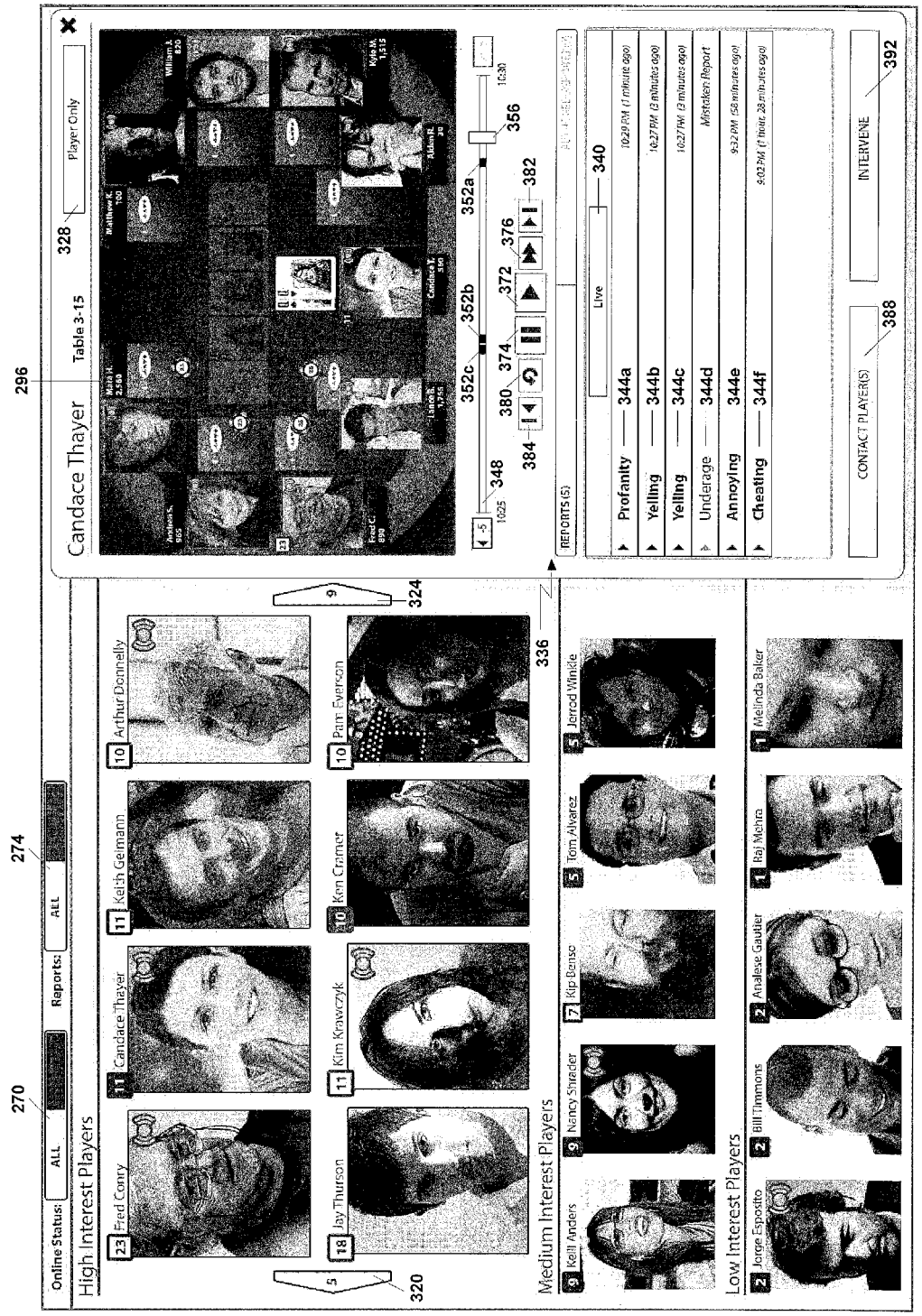
Figure 3H:
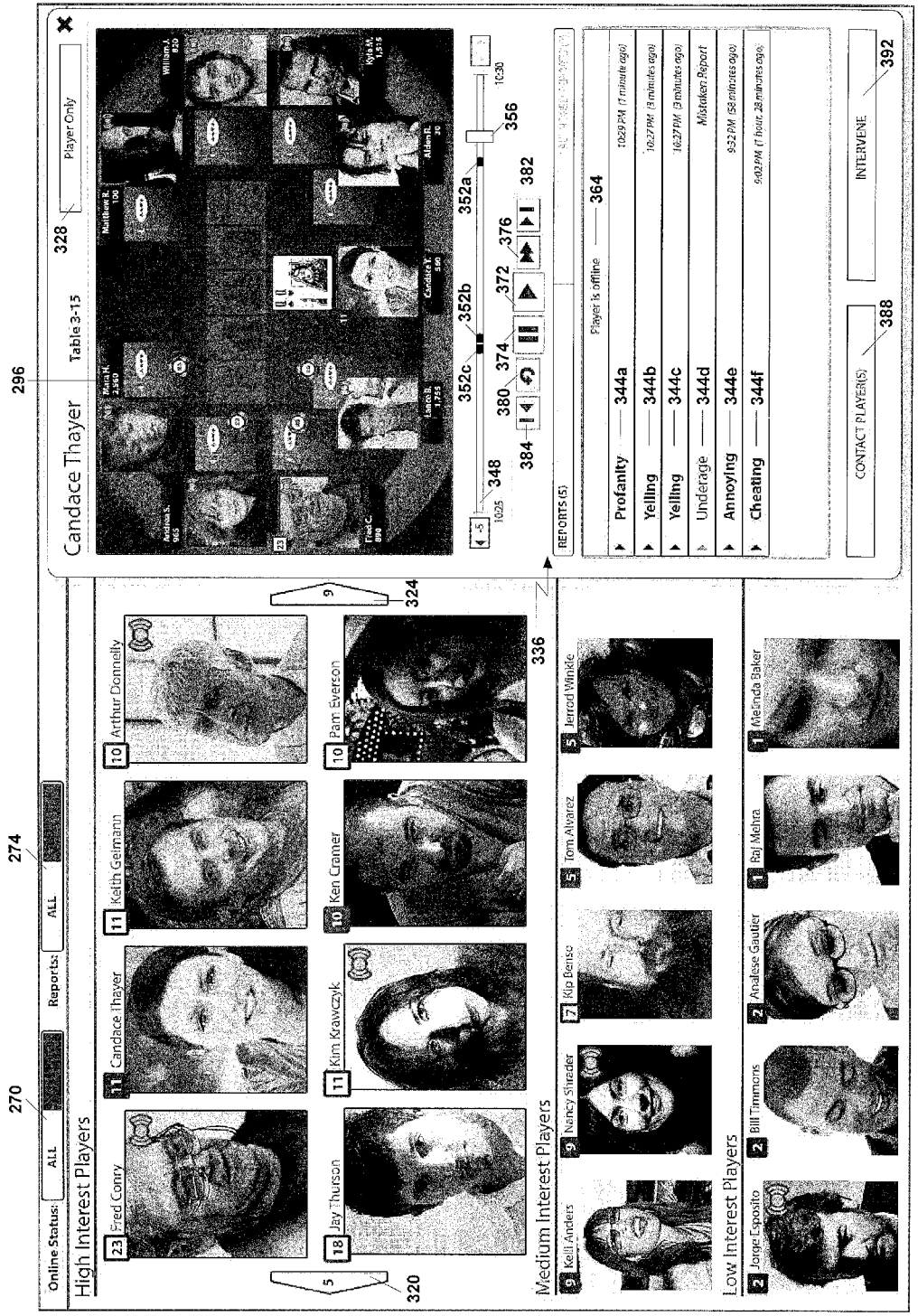

Returning to the example concerning the player Candace T., FIG. 3A, as well as FIGS. 3B-3D, indicates that she has accumulated eleven monitor points. The authorized observer can obtain more information about Candace T. and her monitor points by contacting, clicking on or otherwise activating her image. Such activation can cause a display of a review dialog box 336, which includes the current virtual table 296 at which Candace T. is playing (see FIG. 3G). Based on the online icon accompanying Candace T.'s image in FIG. 3A, the observer can recognize that Candace T. is online or currently playing. Alternatively, if the observer had used one or both of the selector-indicators 270,274 to change the Online Status and/or Reports, the contents of the selected one of FIGS. 3B-3D could also indicate to the observer that she is currently playing (online) at a virtual table. In addition to the game table 296 being shown in FIG. 3G, by activating her image, the observer is also able to obtain, or caused to be displayed, information related to the one or more reports submitted by one or more other players regarding Candace T and which reports relate to her eleven monitor points. Based on the way her monitor points are presented (white monitor points against a dark (e.g. red) background in FIG. 3A (or FIG. 3B, FIG. 3C or FIG. 3D), the observer already understands that one or more reports associated with such monitor points have not been reviewed or handled by an observer, i.e. they are new reports. As depicted in FIG. 3G, the review dialog box 336 thereof generally includes two major portions or sections. A first section depicts the virtual table 296 that has a number of players including Candace T. as one of those players. She is denoted or identified on the table 296 as the player being monitored by the observer by having her image located bottom-center relative to all other players at the table 296. The first section also has a virtual table identifier, which is located above the table 296. In the example of FIG. 3G, this identifier is "Table 3-15," which could identify one particular table (15) found at one specific virtual casino (3). Additionally, the first section has a "Player Only" selector 328, which can be selected or contacted by the observer in order to provide a display different than that represented in FIG. 3G. This different display is illustrated in FIG. 3J and basically shows a larger image of Candace T. (player currently under observation), with the table 296 removed or no longer being illustrated. One last difference is that FIG. 3J has a "See Table" selector 332, rather than the "Player Only" selector 328, so that activation of this selector 332 enables the observer to return to the display of FIG. 3G. Other than these three differences, activating the Player Only selector 328 provides the same display as provided with the screen shot of FIG. 3G.

A second section, which is located below the virtual table 296, of the review dialog box 336 shows a number of segments or components for use by the authorized observer in connection with viewing or managing reports that form the basis for the monitor points assigned to Candace T. As illustrated, these components of the review dialog box 336 include: a "Live" button or selector 340; a list of reports: 344a, 344b, 344c, 344d (including the "underage" report that has been deemed a "Mistaken Report"), 344e, and 344f that resulted in her total of eleven monitor points, with the most recent report 344a being first or at the top of the list, and which list includes the times related to about when the reports were received by the observer system 200; and additional components related to reviewing information on which a report is based and related to communicating with the reported player.

With regard to the observer's review of reports 344, together with reference to the second section of FIG. 3G, the review dialog box 336 also has a time line or bar 348. The time line 348 conveys a linear time scale for use in indicating relative times at which reports 344 were submitted against Candace T. In the embodiment of FIG. 3G, not all reports 344 against Candace T. are representable along the time line 348, as will be explained later. In that regard, only three report buttons 352, which represent confirmed reports 344, namely: report buttons 352a, 352b, 352c are provided along the time line 348. Each report button 352a, 352b, 352c is associated with one particular, relatively recent report. Each of their positions along the time line 348 relates to a time at which that one particular report was submitted against Candace T. Generally, the number of report buttons 352 that can be displayed or provided depends on: (a) the number of current or active monitor points (points not yet fully decreased or erased associated with a particular report) assigned to the reported or reporting player, including the reports resulting in such points; and (b) the time at which the report was submitted relative to the time at which any other report was submitted against that same reporting or reported player. If one or more reports 344 were submitted a relatively long time ago (such as relative to one or more other reports 344), there may not be a report button 352 corresponding to any report 344 that was submitted a relatively long time ago, given the linear nature of the time scale associated with the report buttons 352. That is, the lateral extent along which report buttons 352 can be positioned is limited. This means that the time scale is limited so that report buttons 352 corresponding to relatively older reports might not be displayable. With respect to the embodiment of FIG. 3G, the reports 344e and 344f were submitted a relatively longer time ago so that these reports are not represented by report buttons 352 along the time line 348. Such differences in time can further be understood by comparing the starting and ending times (10:25, 10:30) associated with the time line 348 with the times of the reports 344e and 344f, which times are outside of the time line 348 starting and ending times. Also located along the time line 348 is a "recorded video location" indicator 356. When viewing recorded video associated with a particular report 344, the indicator 356 is useful in providing the observer with information related to the particular location or spot in the video that is currently being shown to the observer.

In this example, Candace T. has eleven current or live monitor points aggregated or taken from the five confirmed reports 344, namely: reports 344a, 344b, 344c, 344e and 344f, with the remaining report 344d being deemed a mistaken report. Taken together these reports 344 can constitute a report list for Candace T. The accused, unacceptable behaviors of Candace T., which are the subjects of the reports 344, are identified in the review dialog box 336 as: profanity, yelling, yelling, annoying and cheating (from the top of the report list to its bottom). Note that the time stamp accompanying the two yelling reports 344b, 344c is the same. This indicates the possibility that these two reports 344b, 344c are from two different players regarding essentially the same behavior. That possibility may result in a finding by the authorized observer that one of the reports 344b, 344c is redundant. If redundant, the observer can remove or delete one of the two reports 344b, 344c and thereby reduce the total monitor points by the number of points associated with the behavior of yelling. In the embodiment in which profanity and annoying are each associated with one monitor point, while yelling and cheating are each associated with three monitor points, this means that the total number of monitor points could be reduced from eleven to eight. Note also in FIG. 3G, between one of the reports related to yelling and the report related to annoying, there is an indication that a report 344d had been submitted by a reporting player alleging that Candace T. was underage. As shown, a decision had been previously been made by an authorized observer that this underage allegation was erroneous and no longer contributes to any monitor points against Candace T. A benefit for keeping this report can be, if one or more additional underage reports are submitted against Candace T., that the observer will find that this type of report was previously handled and the observer can take appropriate action based on an observer's prior decision. Alternatively, the observer might decide to delete this report 344d because, for example, no further underage reports have been submitted for a sufficient time interval.

Related to the reports 344 including placement thereof in the review dialog box 336 is the "Live" button or selector 340. The Live selector 340 is located above the listed reports 344 and can be selected or activated by the observer when the observer wants to view substantially current recorded video of Candace T. Accordingly, selecting the Live button 340 enables the observer to check or see the most current behavior/conduct of Candace T while she is currently playing a game at a virtual table. In the event that the player being observed, or about to be observed, is not currently playing using the system 10, then the Live selector 340 is not present. Instead, a different button is provided, namely, a "Player is offline" indicator 364 is utilized to inform the observer that Candace T. (or another observed player) is not currently connected or involved with the system 10. This different button, which is only an indicator and not capable of being activated, is illustrated in FIG. 3H, with FIG. 3H being the same as FIG. 3G, except for the Player is offline indicator 364.

Returning to the three report buttons 352a, 352b, 352c, together with the time line 348 and the indicator 356, they are located between (in a vertical direction) the virtual table 296 and a number of recording control elements. The most recent report 344a of the three reports 344a, 344b, 344c is associated with the farthest right report button 352a along the time line 348 and the report 344c is associated with the farthest left report button 352c along the time line 348. If the observer should activate the farthest left report button 352c, the observer system 200 can access one or more data files associated with stored or recorded video and audio data for Candace T. concerning the time period that involves this particular report, which is the report 344c involving the alleged yelling. This time period is a predetermined or programmable amount of time of recorded video/audio data, e.g. three minutes. That is, at least the three minutes of recorded video/audio just before the time stamp associated with the particular report involving Candace T. is kept for possible review by an observer. Similarly, recorded video/audio is available for use by the observer for a predetermined or programmable amount of time after the time stamp associated with that report. Such an amount of recording time after the time stamp could be the same or different than the recorded audio/video before the time stamp. The magnitude of the recording after the time stamp could depend on considerations/factors related to optimizing use of storage space.

The recording control elements of the review dialog box 336 comprise standard types of control, such as those used with DVD and/or DVR players, including: play (372), pause (374), higher speed(s) of recorder movement or play in the forward direction (376) and skip back for a predetermined time (380), together with buttons that enable the observer to move or skip to the next report (382) or move or skip to the previous report (384). The second section of the review dialog box 336 also has a "Contact Player(s)" selector 388. This selector is used or activated by the observer when (s)he wants to communicate with the reported player. Such communication involves use of the communications module 246 of the observer station 204. This possible communication is depicted by the phantom line (FIG. 1) between the observer station 204 and the user terminal 100 being used by Candace T. (e.g. 100-1). In one embodiment, the observer communicates by voice only. No video associated with the observer is provided to the player. Conversely, the observer continues to receive the player's video, as well as any audio from the player. Such communications can be used to obtain information and convey any instructions or other statements from the observer to the player, typically related to the one or more reports involving the player. The communications between such a player and the observer are also kept using the recorder 208 and the storage device 216. In such a situation and at least from a recording standpoint, the observer is like a player in that the observer can join the same table as the subject player with whom the observer wants to talk to. The observer can also control availability or access to any communications with any such player by essentially creating a private network so that only the observer and the subject player are privy to any of their communications, while other players at the table are not. In one embodiment, the observer can join the virtual table of the subject player and be assigned a special seat number that does not correspond to an actual table seat. Accordingly, the observer's audio could be heard by all table players, except when the observer creates a private group; however, the observer does not provide any video data to any table player. If a private group is created, only one or more players in the private group can communicate with the observer. Those players not in the private group cannot communicate with the observer, nor can they communicate with any player in the private group. The video of each player in the private group can be encrypted, and viewed only by other players in the group, including the observer. For other players at the table, and not in the private group, the video(s) from the private group player(s) can be replaced by a notation to the effect that such private group players are communicating with an authorized observer.

Positioned adjacent to the "Contact Player(s)" selector 388 is a selector or control 392 identified as "Intervene." The Intervene control 392 can be activated by the observer in connection with conveying and/or implementing a decision regarding one or more identified players, which decision usually relates to the content of one or more reports involving the behavior(s) and/or appearance of the player(s). By way of example, activating the Intervene control 392 could cause a predetermined message to be sent to the player(s) indicating that a judgment is being made against the player(s), which judgment might be that the player(s) is/are ejected from the player's present table for a predetermined time, or that the player can no longer play any game in the system 10 for a predetermined time, or some other judgment or penalty is being imposed on the player(s).

Figure 3I:
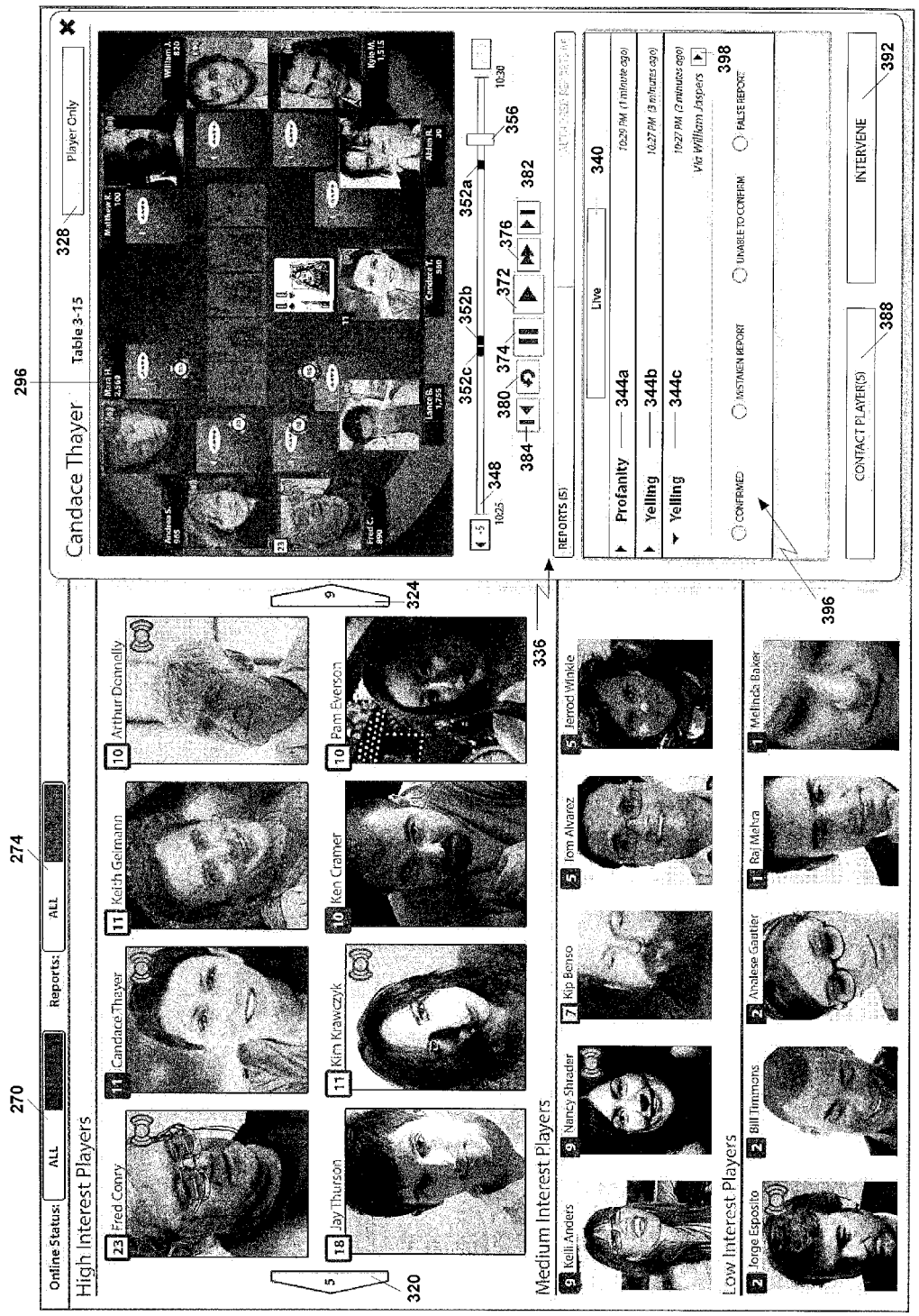
Figure 3J:
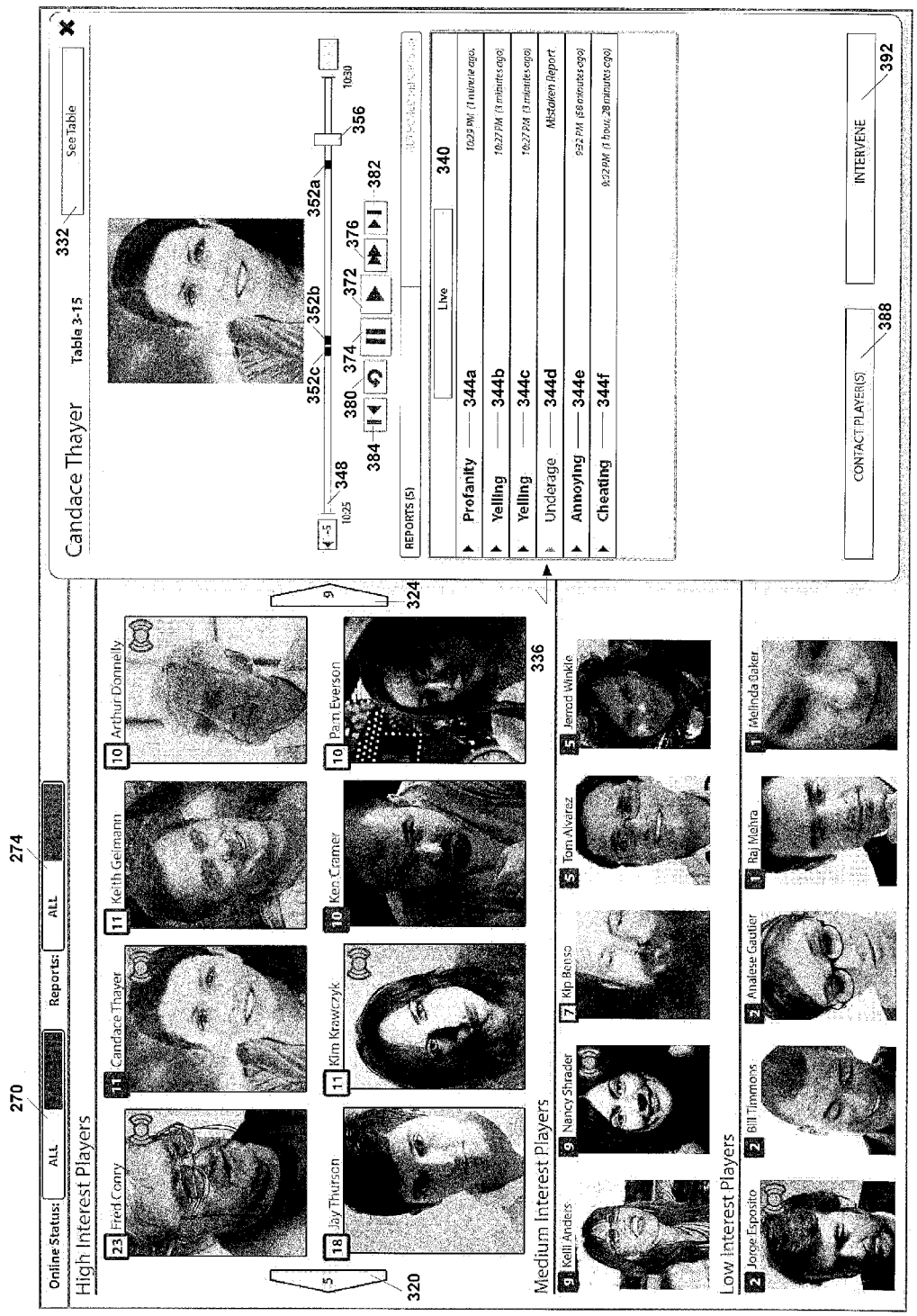

Additional descriptions regarding review of one or more reports by the authorized observer are provided while referring also to FIG. 3I, which is similar to FIGS. 3G and 3H, but also illustrates selection of one of the reports that was submitted involving Candace T. The selected report 344c indicates that the reporting player found or believes that Candace T. demonstrated a "yelling" behavior. In addition to the time stamp, indicative of when this report was received, this new display includes the name of the reporting player (e.g. William Jaspers) and predetermined possible choices 396 related to the observer's decision about the report. These choices 396 can include: confirmed, mistaken report, unable to confirm, and false report. Depending on the observer's decision regarding the report, the observer can select one of these choices 396 and thereby render a judgment about the report. If the observer finds that the report 344c is sufficiently accurate, the observer could select the confirmed option of the choices 396. If the observer finds that the report is not sufficiently accurate, the observer could select the unable to confirm option of the choices 396. If the observer finds that the report was inaccurate or wrong, but also finds that it was unlikely that the reporting playing knew it was inaccurate or wrong, the observer could select the mistaken report option of the choices 396. If the observer finds that the report was inaccurate or wrong and also finds that the reporting player likely knew that it was inaccurate or wrong, the observer could select the false report option of the choices 396. Once a specific report choice 396 is selected and submitted (automatically or otherwise) by the observer for use by the system 10, that report 344 changes from a "new" or unhandled report to a handled or reviewed report that is now included in the list of "All" reports.

With respect to the observer reaching his decision concerning the behavior of Candace T., as alleged in the report 344c, the observer can utilize the video and audio information provided by the user terminal 100 used by Candace T., which information was made and saved about the time this report 344c was received by the observer system 200. The observer can also rely on the game data from the game server 104 that was also recorded about such a time by the observer system 200. This stored information/data is saved for a predetermined time, e.g. seven minutes, according to a rolling recording or method of updating. That is, for every pre-established unit of recording or stored time, such as one second, the oldest unit of time is deleted or no longer saved so that the total amount of time saved (predetermined time) remains the same. However, once a report associated with a player is received, then the information (e.g. player and/or game data) for that player is no longer deleted. Instead, that player's information continues to be kept for a time greater than the predetermined time. That player's information continues to be saved beyond the predetermined time until the observer system 200 is controlled to discontinue the saving of such information, such as by an authorized observer enabling a change so that the saved information is once again limited to the predetermined time. The recorded or stored video/audio data associated with the report can also be saved for a desired time and can be linked to that report for subsequent review or other use. As can be appreciated, since a player's video and audio data is saved or kept for only a limited time, it is necessary that a report involving a reported player's behavior(s) be submitted by the reporting player within a certain time of that behavior occurring. If a report is received after pre-selected or certain time has passed or after the information associated with the accused behavior was deleted, then the observer may not be able to view such alleged unacceptable behavior and may not be able to make a reasoned decision about the player's behavior.

Referring again to the report buttons 352 in the second or lower section of the review dialog box 336 for Candace T. and the case where her video and/or audio information were saved sufficiently close in time to the behavior alleged in the report 344c, the observer can view the video by contacting or otherwise activating the report button 352c associated with this report 344c. When this button 352c is activated, the observer system 200, including the pertinent components thereof, causes her video to be shown starting at sometime within the saved recording, such as a desired time before the stamped received time for the report 344c so that the observer can view the reported player during the time the alleged behavior occurred. The observer can also use the recording control elements displayed below the report buttons 352 to regulate the recording so that the observer can obtain and play the portions of the video that are relevant to the report 344c. After viewing the relevant portions of the saved information for this report 344c, the observer can make a judgment or reach a decision about Candace T. in the context of this particular report 344c. Before doing so, the observer might want to consider the history or other information involving the reporting player who submitted this report. In this example, the reporting player is William Jaspers, as denoted in the expanded section associated with the report 344c and which section having the choices 396 can be used by the observer in designating his decision about this report 344c. To the right of the reporting player's name (William Jaspers) is another selector 398. When activated, this selector 398 can initiate a display of information related to the reporting player. This information could relate to previous reports filed by William J. against Candace T. or any other player(s). Such information could also involve other factors or comments concerning his credibility. After considering available, pertinent evidence, the observer could utilize the identified tools or means provided by the review dialog box 336, including the afore-discussed elements for communicating with Candace T., as well as checking one of the choices 396 or conclusion boxes related to the accuracy of the report 344c.

As can be understood, since there are a number of reports 344 that resulted in eleven monitor points being assigned to Candace T., the observer can also review the other reports 344 in connection with making his decision(s) regarding her. The contents of all such current reports 344 may be material to the decision(s) made by the observer and how such decision should be implemented and/or conveyed to Candace T. Additionally, any ultimate decision could also depend on the observer's interaction with her, with her responses and demeanor possibly contributing significantly to the observer's decision. Depending also on the observer's decision, one or more monitor points could be removed immediately, such as a determination that the allegations in one or more of the reports 344 cannot be confirmed. In any event, once the observer has finished his responsibilities involving the reports 344 and monitor points assigned to Candace T., he can continue his monitoring work by returning, for example, to the display of FIG. 3A, which depicts system players, including showing live video if the player is currently connected, or is blank or a still image of the player if the player is not currently connected, according to player categories with at least certain monitor points. From there, the observer may decide to review another player based on the number of his or her monitor points.

With regard to synchronously outputting videos and audios of players at the observer station 204 as part of the monitoring process, the video and audio data originating from the players' different UTs 100 are first stored using the recorder 208 and the storage device 216. When desired video and/or audio data are selected from all presently stored data for use in monitoring certain players, such desired audio data can be processed to achieve desired synchronization using the decoder 238. The video data associated with the audio data to be synchronized (such video data occurring at the same, or essentially the same, time as such audio data) does not require synchronization due to lack of change therein relative to its associated audio data. Such synchronization refers to ensuring that the stored audio data obtained from each of those players that were selected for displaying or monitoring is taken from/associated with the same, or substantially the same, time. That is, if a first player's audio data sent from his user terminal 100 is associated with time t1 and this is the data that is to be used for output using the observer station 204, then for all players at the virtual table including the first player, their audios should be synced so that all table players' audio data associated with time t1 are output at least at substantially the same time. For example, in those screen shots having a virtual game table as viewed by an observer (FIGS. 3G, 3H, 3I), the audios of the players at the table are synchronously output using the audio speakers 262 after appropriate processing of the applicable audio data found at the storage device 216. More specifically and in the context of using "AirJoin" technology in the communications modules 190 of the user terminals 100, video and audio data are sent from each of the user terminals 100 to the storage device 216 using the recorder 208. Such transmission can involve use of the TCP Internet Protocol. Use of this protocol can result in transmission delays that can vary widely among the user terminals 100. The recorder 208 can use time stamps to indicate the time when each portion/segment/amount of data is stored using the recorder 208. However, the recorder 208 is not capable of determining/knowing when the data from each user terminal 100 was sent. Thus, more information than the time stamps is needed to synchronize the received data, particularly the audio data.

Figure 4A:
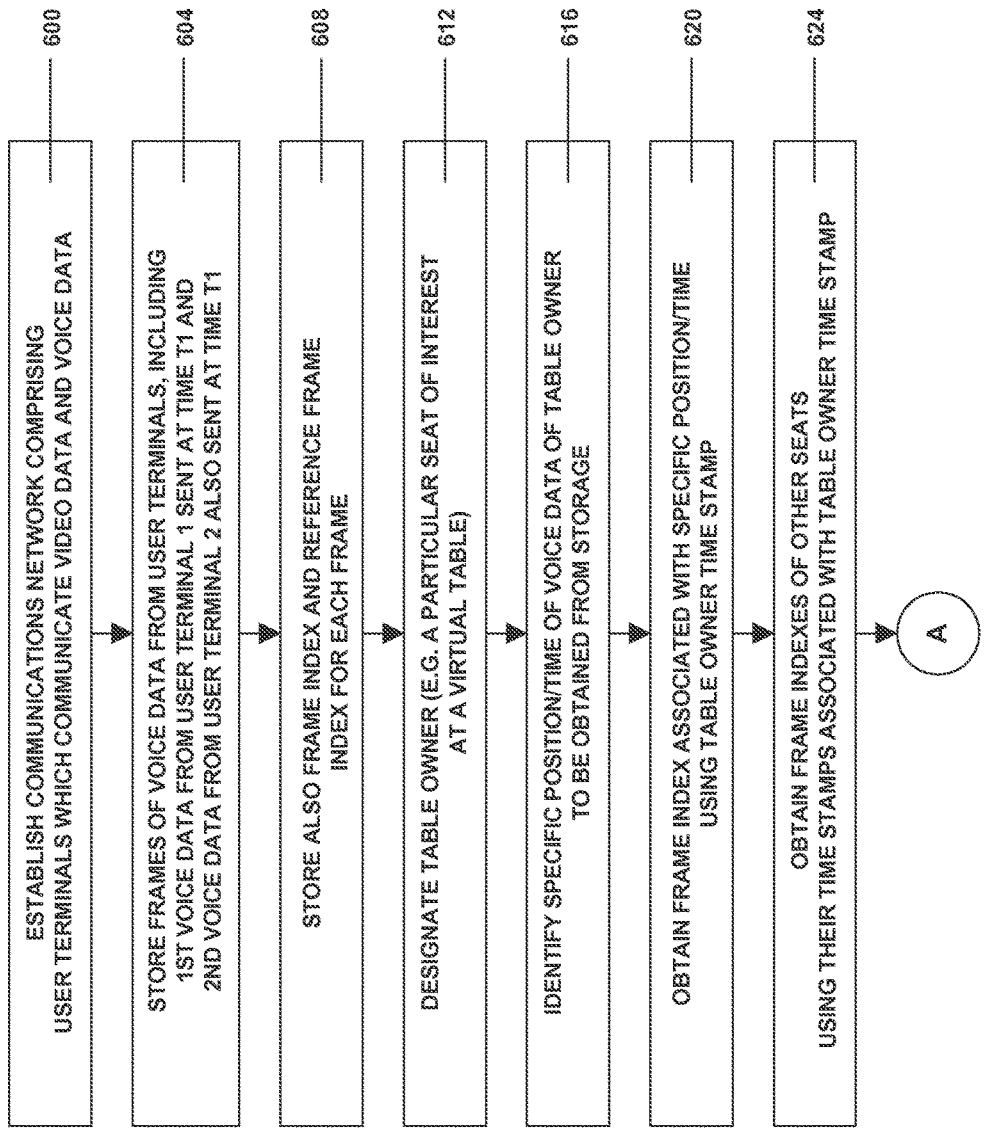
FIGS. 4A-4B are flow diagrams associated with synchronizing stored voice data.

With reference to FIGS. 4A-4B and again to using the "AirJoin" technology and information available in the afore-incorporated applications including related to establishing a communications network comprising user terminals which communicate video data and voice data (block 600 of FIG. 4A), the following describes one way in which such synchronization can be achieved. Referring to block 604, data from the user terminals 100 sent for storage using the recorder 208 can include twenty millisecond frames of encoded audio data, accompanied by zero or more video frames that may have occurred during the twenty millisecond audio frame. Together with the audio and video data, each user terminal 100 sends its own frame index (block 608). The frame index refers to an index which user terminals 100 send to each other so each user terminal 100 can determine when audio frames begin and end. Besides its own frame index, each user terminal 100 sends a seat number and a reference frame index associated with another user terminal 100 ("reference UT"), which is part of the same virtual table. The reference frame index refers to a frame index of the reference UT 100 that the particular user terminal 100 has received at the time it sends its own frame index for storage using the recorder 208. According to this example and one embodiment, the reference UT 100 can be chosen as follows: (a) if the particular or subject user terminal 100 is a slave node or slave user terminal 100, then its reference UT 100 will be the master terminal or node 100 with which it directly communicates; (b) if the particular or subject user terminal 100 is a master terminal or node 100, then its reference UT 100 will be another master terminal or node 100. Such a reference UT 100 will have the smallest node number greater than itself, unless the particular or subject user terminal 100 is the master terminal 100 which has the largest node number, then its reference UT 100 will be the master terminal 100 that has the smallest node number; and (c) if there is only one master terminal 100, then its reference UT 100 will be any one of the other user terminals 100 in the network, i.e., any one of the slave nodes. Choosing a reference UT 100 as just outlined results in each UT 100, or node, referencing another user terminal 100, or node, in the network (e.g. all user terminals 100 currently involved with playing the online game at the virtual table), although such referencing may be accomplished using reference(s) to one or more intermediate user terminals 100, or nodes.

With the foregoing background information in mind, a methodology for achieving synchronization and overcoming or taking into account any transmission delays or delay differences among user terminals 100, such as when TCP is utilized in transmitting the data, is next described. Initially and referring to block 612, one of the user terminals 100 can be designated the "table owner." Again in the context of the virtual table and one of the players at the virtual table being subject to monitoring by the authorized observer, the table owner could be the particular player who is the focus of the current monitoring operation being conducted by the authorized observer. That is, the table owner could be the player to whom all current seeking of audio and/or video data is to be made. After the table owner is designated and referring to block 616, a determination is made related to identifying a specific position or time in the continuous stream of data that is to be output using the observer station 204, which can be either non-real time or at least substantially real time. With such a position identified including a specific frame index associated with the table owner (block 620), the time stamps are used to locate and provide identifying information for those frame indexes of the other seats (other UTs 100 with their current players) at the table, which are close in time to the desired or selected specific position associated with the table owner's frame index (see block 624 of FIG. 4A). With reference to block 628 of FIG. 4B, such located frame index information is found or made available so that such information can be used in making comparisons. After such frame indexes are found, starting with the designated table owner, the frame index of the reference UT 100 associated with the particular user terminal 100 (e.g. the table owner's UT 100) is compared to the reference index of the particular UT 100 (e.g. the table owner's UT 100) that it recorded for its reference UT 100 or seat. Ideally, these two indexes would match. Referring to block 632, if they do not match, the location by time of the audio frame of the reference UT 100 is changed or offset until the two frame indexes (reference index transmitted by the particular UT 100 and the frame index of the reference UT 100) do match. Next at block 636, this process involving comparisons is conducted for other seats or UTs 100 currently playing at the table to determine any offsets of other seats. That is, as each offset is determined based on a comparison involving two seats, offsets of other seats can be determined in the same manner, since each of the other seats either reference a seat whose offset can be determined or are referenced by a seat whose offset can be determined. This offset determination process continues until any and all offsets are found, with the table owner's offset being zero by definition. See block 640.

After all offsets associated with frame locations involving the different seats or UTs 100 at the table have been determined with reference to the table owner's seat/UT 100, it may also be necessary to sync such player data with game data (see block 644). Generally, the objective is to have the observer station 200 output corresponding-in-time audios from each of the table of interest UTs 100 at least at substantially the same time so that the resulting audios from the players, as output using the audio speakers 262, are synced or accurate in time with each other. A further related objective, when game data is also available, is to ensure that it is accurately output with player data. Such synchronization can be accomplished one way by linking a game data event, such as the dealer dealing a card to the table owner/player being observed, to the audio (or audio and video) associated with that observed player at the time the card is dealt. That is, the control 230 of the observer station 204 is involved with synchronizing such audio/video data with the game data event. More specifically, when the card is dealt, a reference clock can be associated with the observed player, which clock can have a zero or some other reference time, so that the card dealing event is deemed to have occurred at this reference time. Based on this predetermined or particular event and the reference time, the audio and video of the observed player can be synced with the game data. Subsequently, each of the other players playing the game with the observed player can have their player data synced with the player data of the observed player by determining which audio, or combination audio/video, of each other player is associated with this reference time. Since each of the other player's audio/video is synced with the observed player's audio/video, each of the other player's audio/video is also synced with the game data. In another embodiment, instead of syncing each of the other player's audio/video to the player data of the observed player, the audio/video of each of the other players could by separately synced to the game data, just like the player data of the observed player was individually synced to the game data. This process causes game data to be synced to the player data of the player being observed. With this synchronization accomplished, game video/audio can be properly output based on time with corresponding player audios. It is noted that the delay from the game server 104 for storage by the storage device 216 using the recorder 208 can be considered de minimus so that the time stamps associated with the game data should not require adjustments due to offsets.

Figure 4B:
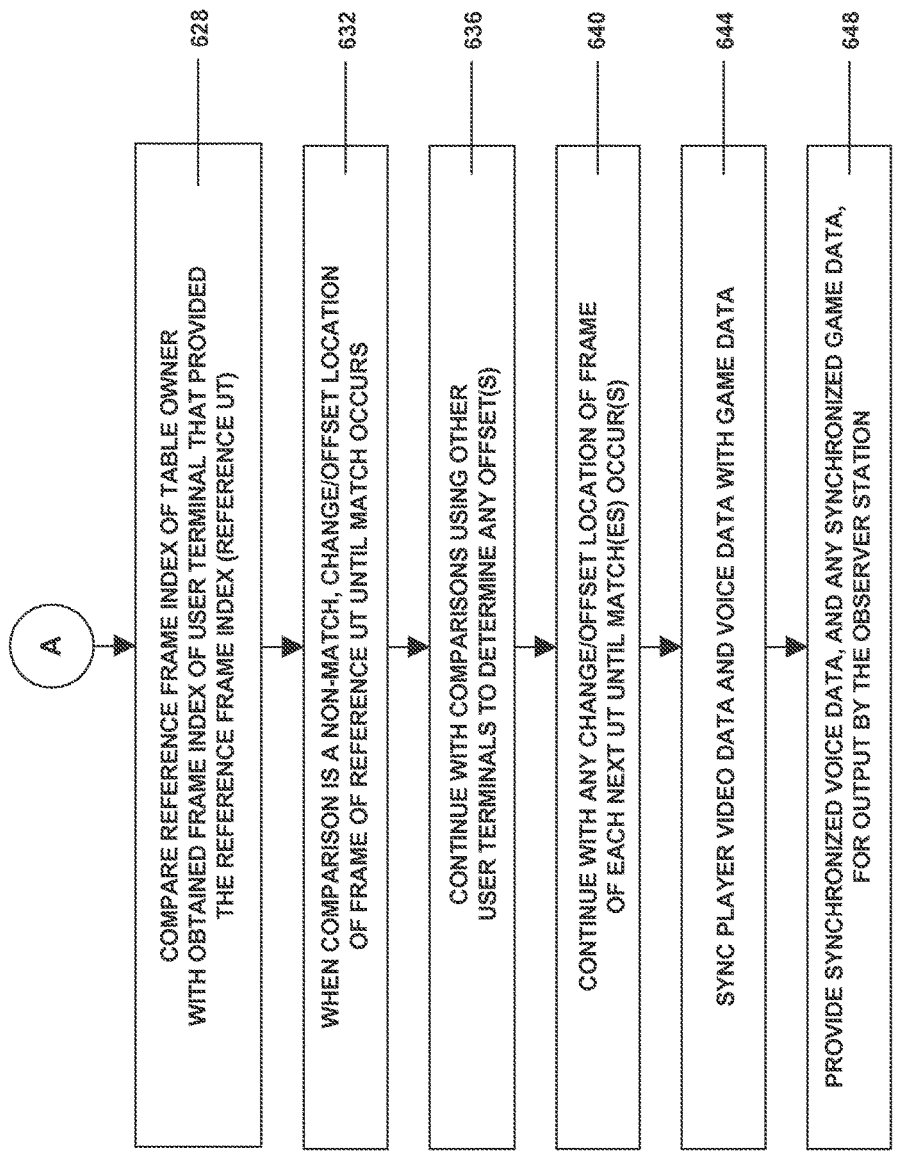

At block 648 of FIG. 4B, after such synchronization processes are finished, the playback 212 and/or decoder 238, under control of the observer station 204, can be used to provide the synced audio data to the observer station 204. During these steps of desired synced data delivery, it may be that at least some of such data will not remain synchronized, at least with respect to real time, or substantially real time, audio data being delivered. Checks can be periodically made to determine whether or not there has been any sufficient drift away from synchronization. If such a check reveals sufficient drift, any affected seat(s) associated with one or more UTs 100 could have their data delivery speeds suitably adjusted for use in compensating for any such drift. Each of the data delivery speeds associated with seats/applicable UTs 100 are usually slightly different already to compensate for clock drift between or among UTs 100 since none of them have exactly the same clock rate associated with their audio frames.

As a variant, or in addition, to the features just described related to FIG. 1, relatively automatic determinations regarding players' behaviors and/or appearances could be included as part of the observer system 200. Conventional or novel (at least in part) face recognition and/or face detection software might be utilized with or applied to players' video data to check for predetermined or certain circumstances that might be indicative of instances where actions can or should be taken by the observer system 200 and/or by the authorized observer against a particular player or players. More specifically, video data associated with a particular player can represent that player's image (e.g. player's face or portions thereof). If that image does not essentially stay the same as determined by the face detection or recognition software, it could mean that a different and non-authorized person is now playing the online game. If the same person is not playing the game, it could be indicative that a substitute player is playing who does not meet the age requirements and should be checked. Similarly, if video data from a particular user's terminal does not represent face portions as determined by face recognition or detection software, such video data would therefore be indicative of the fact that no face portions are currently present. As a result, proper monitoring of that player cannot occur and the system could provide notification to that effect. Video data that represents a lack of movement associated with a particular player could also be the subject of an automatic determination that such a player should be checked. Including appropriate software to work with or analyze player video data can therefore lead to certain determinations related to player behaviors (e.g. different face portions, no face portions present, lack of player movement) and/or underage possibilities. These determinations could be accomplished relatively automatically and could lead to set or pre-established remedies or other actions that could require little, if any, intervention or other actions on the part of an authorized observer.

Figure 5:
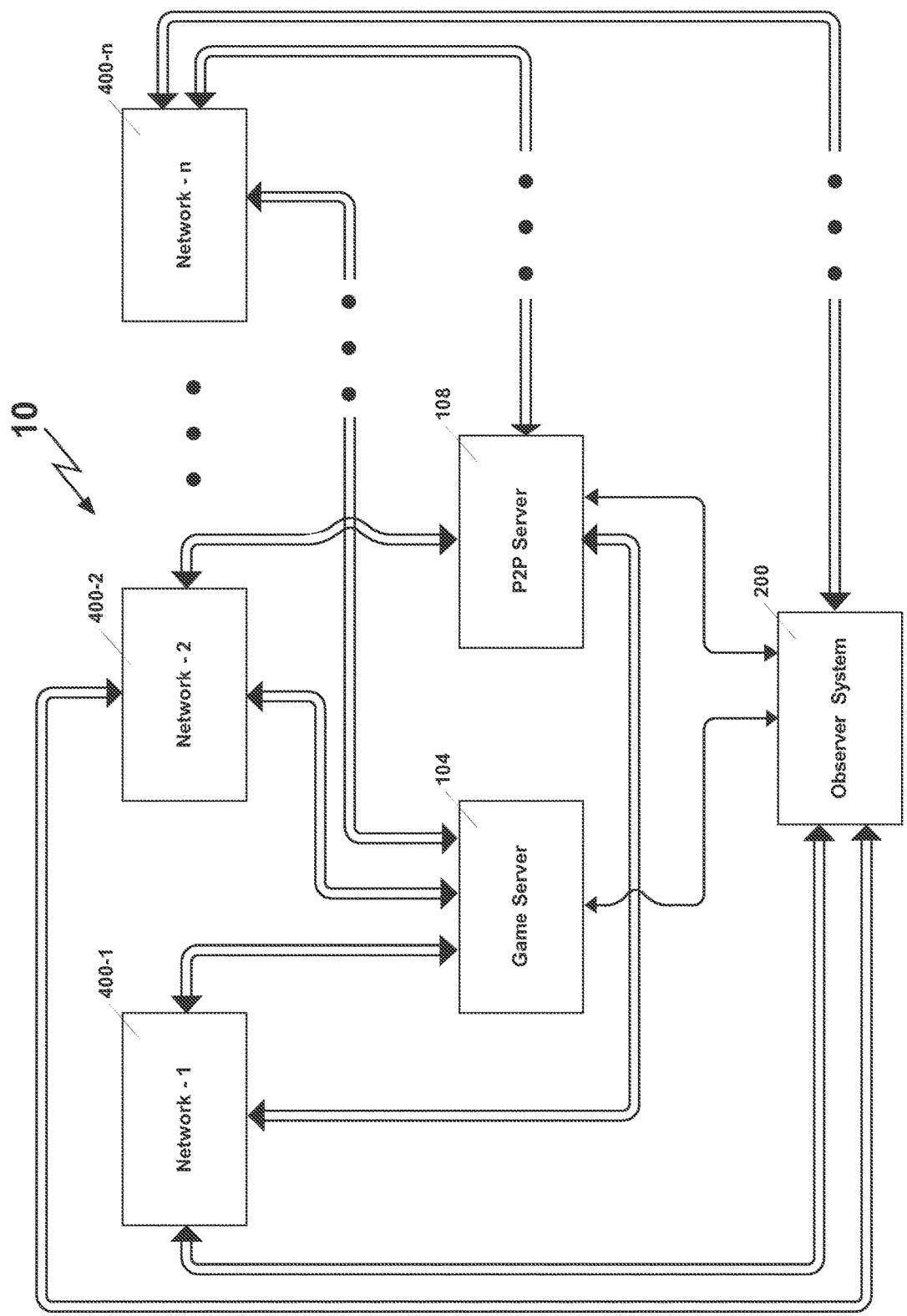
FIG. 5 is a block diagram of an embodiment that depicts a number of networks in communication with one observer system.

With reference now to FIG. 5, an embodiment of the system 10 is illustrated characterized by the observer system 200 communicating with multiple established networks 400-1, 400-2 . . . 400-$n$. Each of the networks 400 can be associated with a number of players who are playing an online game together. Basically, the only meaningful difference between the multiple networks of FIG. 5 and the single network of FIG. 1 is that the observer system 200 can communicate with more than one network so that the observer system 200 can receive, for example, player data and game data from user terminals 100 found in more than one network. Accordingly, an authorized observer is able to monitor players using the observer system 200 who are playing multiple, and possibly different, online games. The observer system 200 of FIG. 5 is therefore fundamentally equivalent to that previously described involving FIG. 1. Related to that, the operable or communication connections involving each of the networks 400, the game server 104, the p2p server 108 and the observer system 200 can be the same as that discussed with FIG. 1, and with such connections diagrammatically illustrated in FIG. 5. Likewise, the functions of the various components and the operational methods of operation in respect to player monitoring capabilities, including those controllable by one or more authorized observers, between each of the networks 400 and the observer system 200 can be the same.

Figure 6:
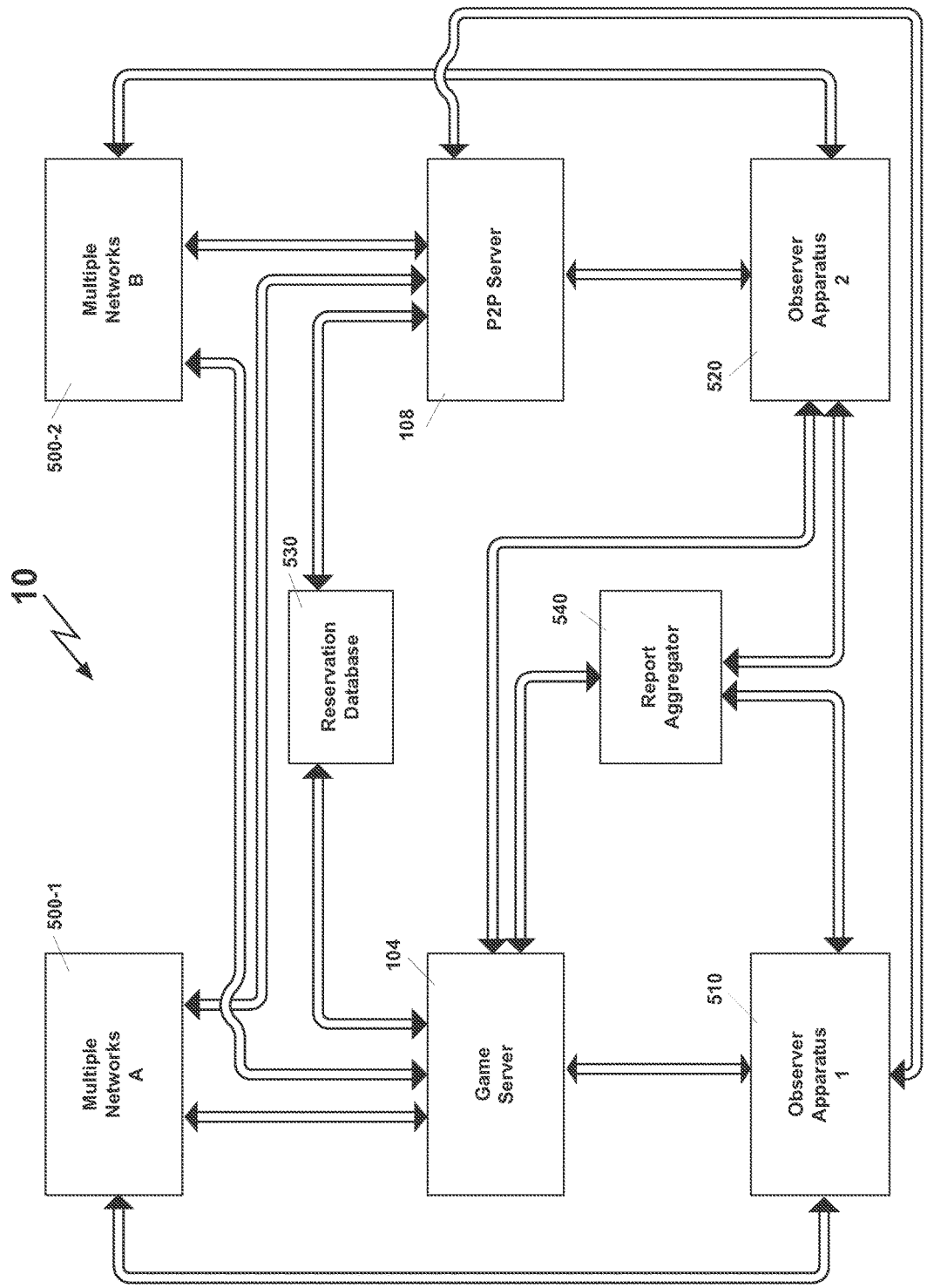
FIG. 6 is a block diagram of another embodiment characterized by multiple networks communicating with multiple observer apparatuses, which are similar to observer systems except that each observer apparatus uses a common reservation database and a common report aggregator.

A further embodiment of a system 10 involving more than one established network is illustrated in FIG. 6. This embodiment is characterized by utilizing more than one observer system 200, or more than one of certain components of the observer system 200. Such an embodiment can be implemented when there is a sufficiently large system having a substantial number of currently established networks (the same or different, but separate, online games simultaneously being played). In such a situation, it may be necessary or appropriate to spawn off, or otherwise include, additional of those components previously described. As conveyed by FIG. 6, rather than the multiple networks 400-1 . . . 400-n of FIG. 4, there are sets of multiple networks, such as multiple networks A 500-1 and multiple networks B 500-2. Each multiple network A and B 500-1, 500-2 is comparable to the multiple networks 400. In this embodiment, only a single game server 104 and single p2p server 108 are provided, although a variant thereof is to utilize more than one of one or both of them. This embodiment is different than that of FIG. 5 in that, instead of a single observer system 200, two observer apparatuses 510, 520 are employed. Generally, the observer apparatuses 510, 520 can be different than the observer system 200 in the sense that each does not include its own reservation database 530 and report aggregator 540. Instead, both observer apparatuses 510, 520 use or share the same reservation database 530 and the same report aggregator 540. Stated another way, the observer apparatuses 510, 520 are equivalent to the observer system 200, including the components being the same or comparable, except that each observer apparatus 510, 520 is defined as not including the commonly shared reservation database 530 and report aggregator 540. The uses of the components of each observer apparatus 510, 520, including their functions, operations, interactions and communications, are at least substantially equivalent to those other components (not including the reservation database 220 and the report aggregator 224) of the observer system 200. Consequently, the previous descriptions in the context of the other embodiments regarding those components apply to those defining each observer apparatus 510, 520. And, the descriptions involving the reservation database 220 and the report aggregator 224 of the observer system 200 apply at least substantially to the reservation database 530 and the report aggregator 540. Although the report aggregator 540 is illustrated as a separate unit from each observer apparatus 510, 520, it might be incorporated with same unit, server, computer or other machine that includes the recorder and playback of one of the two observer apparatuses 510, 520. That architecture might also be incorporated in the FIGS. 1 and 5 embodiments. That is, the software defining the report aggregator 224 might be included in the same unit, server, computer or other machine that implements, or is associated with, the recorder 208 and the playback 212 software components. It should also be appreciated that there might be more multiple networks than multiple networks A and B 500-1, 500-2, which might require more observer apparatuses than the observer apparatuses 510, 520. Similarly, more than a single reservation database 530 and/or a single report aggregator 540 might be required to function with other components of a particular online gaming system including continuous monitoring operations.

A possible variant to the FIGS. 1, 5 and 6 embodiments might be use of a star network, rather than a p2p network, in which all user terminals 100 in a network communicate with each other through the operations of a central server. Such a central server could be utilized instead of the p2p server 108, with the central server managing or being responsible for all communication transfers involving each of the UTs 100 in the single network of FIG. 1 or the multiple networks of FIGS. 5 and 6. That is, video and audio data communications among players are routed first to the central server and then sent to the intended or appropriate user terminal(s) 100. Any such embodiment that uses a central server would not materially alter the functions associated with the observer system 200, or the observer apparatuses 510, 520 and their connected components.

Another related embodiment is directed to those online games which can be termed single player games. One example could be slots games in which each player plays his or her own slots game and where there could be substantial numbers of slots players playing at the same time, but still playing their own selected slots game. In such an embodiment, monitoring might be limited to determining or checking whether or not each such player was age eligible to play the slots game, and monitoring player behaviors might not be necessary since interactions among two or more slots players that could result in unacceptable behaviors might not exist. This embodiment could basically be implemented according to FIG. 1, except that communications between and/or among user terminals 100 might not occur. Although the connections and communications by user terminals 100 with one or more game servers 104 and p2p servers 108 could be provided as previously described including the references to the incorporated patent applications, this embodiment might be implemented using at least one central or main server, instead of p2p server(s). Player video data, useful in the subsequent outputting of video related to player appearances, can be sent by the user terminals 100 to the observer system 200. As previously described related to methods and operations associated with player monitoring, an authorized observer can review videos of players playing single user games in conjunction with making decisions about whether or not the players are of a sufficient age to play the online game.

Further descriptions regarding the embodiments of the present invention are also provided in the context of data flow that can exist during system operations. The following is mainly directed to the FIG. 1 embodiment. However, it can be understood that the FIG. 5 and FIG. 6 embodiments are applicable, at least in part. For example, it might be that more than one observer station, recorder and/or playback are(is) included with the system. If so, during communications or other operations, the unique identity of each such component might have to be transmitted and associated, when applicable, with a particular transmission or transfer. There could also be more than one game server involved in system operations and the identity of each might be tracked as part of at least certain system operations. The data flow descriptions now follow in the form of succinct steps or stages with accompanying headings.

1. Player Begins Game Play
  a. Upon launch of the software client for playing an online game by a user terminal 100, the client/game software component connects to a game server 104.
  b. The game server 104 sends the player's location (reservation in the form of a unique virtual table identifier) to the reservation database 220.
  c. The game server 104 notifies the client/game software of the reservation or player's table location.
  d. The client/game software notifies the user terminal communications module 190 of the reservation.
  e. The communications module 190 connects to the p2p server 108 and notifies it of the reservation.
  f. The client portion of the communications module 190 residing with a user terminal 100 establishes voice and video communications with other client portions of the communications module 190 residing with other user terminals 100.
  g. The p2p server 108 requests the recorder 208 for the reservation from the reservation database 220 and awaits response.
  h. After response, the p2p server 108 notifies the communications module 190 of the recorder 208 for the reservation.
  i. The communications module 190 connects to the recorder 208, notifying it of the user terminal's unique user name, reservation, and name of the game server 104.
  j. The recorder 208 connects to the game server 104 to let the game server 104 know that the player is being recorded and to verify that the information from the user terminal 100 is valid.

2. Player Makes a Report 344.
  a. Player clicks a button using the video screen 150 of the player's user terminal 100 causing a report form 300 to display on the video screen 150 of the user terminal 100. The report form 300 can indicate which player is the subject of the report 344.
  b. Player completes the report form 300 and clicks the "Submit Report" button 316.
  c. The client/game software running on the user terminal 100 sends the information from the report form 300 to the game server 104.
  d. The game server 104 forwards the information (after as much validation as possible) to the report aggregator 224.
  e. The report aggregator 224 adds the report 344 to the list for the player specified in the report 344 and to the list of reports 344 generated for the reporting player. The number of monitor points assigned to the reported player may be modified depending on the credibility factor that might be associated with the reporting player.
  f. The report aggregator 224 notifies the observer station 204 that was assigned to monitor the specified player of the change in monitor points.
  g. The observer station 204 software deals with the change in monitor points as needed (move from low to medium interest, or medium to high interest, for example).

3. Authorized Observer Begins Monitoring
  a. The observer station 204 connects to the report aggregator 224 announcing monitoring availability.
  b. The report aggregator 224 has a record for each player who has an active report 344 and has a record for each player who is currently playing (online). The report aggregator 224 also has a record of each lock, as described below, and each observer station 204 can have no more than one lock.
  c. The report aggregator 224 assigns players to monitor to the observer station 204 (players may be moved from other observer stations 204 as observer stations 204 are added or removed)
  d. The observer station 204 displays a list of players separated by category (high/medium/low interest) based on the number of monitor points assigned to each player.

4. Authorized Observer Monitors a Player
  a. The observer may select individual players to focus on by clicking/tapping. This brings up the player review dialog box 336 that has a video window along with a list of reports 344 made against the player. The video window may show live or substantially live video if the player is currently connected, a previous report, a blank or a still image of the player if the player is not currently connected. When a player is selected, the observer station 204 requests a lock from the server, which is executing the software of the report aggregator 224 associated with that player. If that player is already locked because he or she is being observed by another observer who has previously selected that player, the lock request fails. A notice to that effect is provided to the observer station 204 making the request. If not currently locked, that player is assigned to the observer station 204 that requested the lock and is removed from the list of players observed by the observer station 204 that such player is currently assigned.
  b. If the observer selects a report 344 from the list, video of the player near the time of the report 344 is displayed.
  c. The observer may "resolve" reports 344 using the review dialog box 336 associated with the subject player.
  d. The observer can also bring up a larger view of a particular player by clicking/tapping the "Player Only" button 328 of the review dialog box 336 associated with the subject player so that the view changes from the entire game table 296 to the particular player. To return to the table view, the "See Table" button 332 can be contacted so that the view changes back to the table view.

5. Viewing a Report 344 by the Authorized Observer
  a. The report 344 can identify the recorder 208 for the player at the time the report 344 was made and can provide the reported player's table identifier.
  b. The observer station 204 software notifies the decoder 238 of the recorder 208 and other information so it can communicate with the playback 212 associated with the recorder 208.

In view of the above descriptions, including directed to a number of inventive embodiments, it can be understood that monitoring systems and methods have been presented which enable substantial numbers of online game players to be effectively and efficiently monitored, especially for their behaviors and appearances. Such monitoring can be substantially continuous whereby player video data and/or game video data are provided for one or more players at least at sufficient times during online game play so that proper or satisfactory monitoring of such players can occur. Such sufficient times might be accomplished by appropriate providing of sampled player video data and/or game data, rather than by providing such data strictly continuously. The foregoing discussion has also been presented to encompass various embodiments of the invention, including all types of communication networks and not only the preferred type(s) described in the afore-incorporated patent applications. Related to that, a system of the present invention could involve a combination of different types of communications networks that might include a star network, so long as any such communications network(s) contributes to the satisfactory obtaining of player data or other such material or related information in order to achieve the primary goal of player monitoring. Further, the descriptions are not intended to limit the invention to the form disclosed herein. Consequently, further variations and modifications commensurate with the above teachings, within the skill and knowledge of the relevant art, are within the scope of the present invention. The embodiments described hereinabove are further intended to explain the best modes presently known of practicing the invention and to enable others skilled in the art to utilize the same as such, or in other embodiments, and with the various modifications required by their particular application or uses of the invention. It is also intended that the claims be construed to include alternative embodiments to the extent permitted by the prior art.

What is claimed is:

1. A system comprising:
   (a) a first user terminal including a first processor, a first microphone, a first camera, a first speaker, a first video screen and a first storage device storing first instructions which, when executed by the first processor, cause the first processor to:
      (i) transmit first audio data that includes first voice data associated with a time t1 to a second user terminal and an observer system;
      (ii) transmit first video data associated with a first facial image to the second user terminal and the observer system;
      (iii) display a first plurality of facial images including a second facial image;
      (iv) display a report first element with the second facial image;
      (v) in response to the report first element being activated, display: (A) a report second element that is configured to be activated; and (B) a form report configured to enable a user to input second user information;
      (vi) generate a first report using said form report, the first report including the second user information; and
      (vii) in response to the report second element being activated, transmit the first report to the observer system;
   (b) the second user terminal including a second processor, a second microphone, a second camera, a second speaker, a second video screen, and a second storage device storing second instructions which, when executed by the second processor, cause the second processor to:
      (i) transmit second audio data that includes second voice data associated with the time t1 to the first user terminal and the observer system; and
      (ii) transmit second video data associated with the second facial image to the first user terminal and the observer system;
   (c) the observer system being in communication with the first user terminal and the second user terminal, the observer system including a third processor, a third microphone, a third speaker, a third video screen, a third storage device storing third instructions which when executed by the third processor, cause the third processor to:
      (i) receive the first voice data from the first user terminal after a first-time interval;
      (ii) receive the second voice data from the second user terminal after a second-time interval that is different from the first-time interval;
      (iii) store the first voice data and the second voice data at the third storage device;
      (iv) using the first report, determine a first number of monitor points associated with the second facial image;
      (v) display a number of facial images including the second facial image;
      (vi) display the first number of monitor points associated with the second facial image simultaneously with the number of facial images;
      (vii) display a number of monitor points associated with each of at least some of the number of facial images, the number of facial images being different from said first plurality of facial images displayed by the first user terminal;
      (viii) in response to a predetermined portion of the number of facial images which are displayed by the third video screen being activated, display a second plurality of facial images including the second facial image;
      (ix) display a plurality of report buttons, including a first report button;
      (x) using the first report button and the third storage device, access a first video that includes the second facial image;
      (xi) generate synchronized voice data by synchronizing the first voice data and the second voice data; and
      (xii) output the synchronized voice data using the third speaker.

2. The system of claim 1, wherein when executed by the third processor, the third instructions cause the third processor to output the synchronized voice data based on the second-time interval.

3. The system of claim 1, wherein when executed by the first processor, the first instructions cause the first processor to:
   (a) transmit, a first frame index associated with the first voice data to the observer system, the first frame index indicating when an audio frame associated with the first voice data begins and ends; and
   (b) transmit, simultaneously with the first frame index, a reference frame index associated with the first voice data, wherein the reference frame index refers to a second frame index of a reference user terminal, wherein the reference frame index is used when transmitting the first frame index.

4. The system of claim 3, wherein when executed by the third processor, the third instructions cause the third processor to determine whether a match exists between the reference frame index and a frame index associated with at least reference voice data transmitted using the reference user terminal and received by the observer system.

5. The system of claim 4, wherein when executed by the third processor, the third instructions cause the third processor to, in response to determining that the match does not exist, change a location by time of an audio frame of the reference user terminal such that the reference frame index matches the second frame index of the reference user terminal.

6. The system of claim 1, wherein the observer system further includes a recorder and a time stamp indicative of when the first voice data is received by said recorder.

7. The system of claim 1, wherein the predetermined portion of the number of facial images includes the second facial image.

8. The system of claim 1, wherein the first report is generated while said first video is generated.

9. The system of claim 1, wherein the first report has a time stamp indicating time and said first video includes a predetermined time of video before said time of said time stamp.

10. The system of claim 1, wherein when executed by the third processor, the third instructions cause the third processor to display a report list simultaneously with said plurality of report buttons, said report list including an identification of the first report.

11. The system of claim 1, further comprising a game server in communication with the first user terminal and the second user terminal, wherein when executed by the first processor, the first instructions cause the first processor to transmit the first report to the game server.

12. The system of claim 11, wherein:
(a) the observer system further includes a report aggregator;
(b) the game server is configured to transmit the first report to the report aggregator; and
(c) the report aggregator is configured to determine the first number of monitor points associated with the second facial image.

13. The system of claim 1, wherein when executed by the third processor, the third instructions cause the third processor to display at least some of the second user information of the first report at the same time said plurality of report buttons are displayed.

14. The system of claim 1, wherein the report first element includes a report bar and the report second element includes a report submit bar.

15. The system of claim 1, wherein when executed by the first processor, the first instructions cause the first processor to display said first plurality of facial images at the same time it shows at least one of the report first element and the report second element.

16. The system of claim 1, wherein when executed by the third processor, the third instructions cause the third processor to not display the number of facial images while displaying said second plurality of facial images.

17. The system of claim 1, wherein the second user information includes information about at least one of behavior and appearance associated with the second facial image.

18. The system of claim 1, wherein said first video is associated with a time period and in which the first report is generated during said time period.

19. The system of claim 1, wherein when executed by the third processor, the third instructions cause the third processor to receive the second facial image of said second plurality of facial images from the second user terminal using at least the second camera and the third storage device.

20. The system of claim 1, wherein said first video is deleted from said third storage device at least after the first report is not used in connection with the second facial image.

21. The system of claim 1, wherein:
(a) when executed by the first processor, the first instructions cause the first processor to:
  (i) enable the user of the first user terminal to input the second user information using said form report; and
  (ii) enable the user of the first user terminal to activate the report first element and the report second element;
(b) when executed by the third processor, the third instructions cause the third processor to:
  (i) enable an observer to activate the predetermined portion of the number of facial images that are displayed; and
  (ii) enable the observer to use the first report button to access said first video.

22. The system of claim 1, wherein when executed by the third processor, the third instructions cause the third processor to communicate at least system voice data from the observer system to the second user terminal.

* * * * *